US012799963B2

(12) United States Patent
Guthrie et al.

(10) Patent No.: US 12,799,963 B2
(45) Date of Patent: Nov. 17, 2026

(54) EXPANSION BOLT AND PIVOT AND SWIVEL MECHANISM THEREFOR

(71) Applicant: WERNER CO., Itasca, IL (US)

(72) Inventors: Karl Guthrie, Austin, TX (US); Ivan A.J. Kekahuna, Austin, TX (US)

(73) Assignee: WERNER CO., Itasca, IL (US)

( * ) Notice: Subject to any disclaimer, the term of this patent is extended or adjusted under 35 U.S.C. 154(b) by 0 days.

(21) Appl. No.: 18/897,363

(22) Filed: Sep. 26, 2024

(65) Prior Publication Data

US 2025/0012310 A1 Jan. 9, 2025

Related U.S. Application Data

(63) Continuation of application No. 18/392,514, filed on Dec. 21, 2023, now Pat. No. 12,129,880, which is a (Continued)

(51) Int. Cl.
*F16B 13/06* (2006.01)
*A62B 35/00* (2006.01)

(Continued)

(52) U.S. Cl.
CPC ........ *F16B 13/063* (2013.01); *A62B 35/0068* (2013.01); *B66C 1/66* (2013.01); *F16B 13/0891* (2013.01)

(58) Field of Classification Search
CPC ....... B66C 1/66; B66C 1/666; A62B 35/0068; F16B 13/063; F16B 13/0891;

(Continued)

(56) References Cited

U.S. PATENT DOCUMENTS 1,419,016 A * 6/1922 Capirosso ............... E21C 29/08 248/231.91
1,469,666 A * 10/1923 Pleister ................. F16B 13/068 411/24

(Continued)

FOREIGN PATENT DOCUMENTS

CH 688061 A5 * 4/1997 ............ F16B 13/063
DE 2632487 A * 1/1978

(Continued)

OTHER PUBLICATIONS

Guardian Fall Protection "Guardian Fall Protection Product Catalog 2012" www.guardianfall.com, 209 pp. (relevant—pp. 82-84).

*Primary Examiner* — Eret C Mcnichols
(74) *Attorney, Agent, or Firm* — Michael Best & Friedrich LLP

(57) ABSTRACT

An expansion bolt including a housing member integrally formed as a single piece of material, the housing member having a base, a plurality of elongate elastic members extending distally from the base, the elongate elastic members distally terminating in respective spoons, and the elongate elastic members having thicknesses that are substantially less than thicknesses of the base and the spoons, a central shaft member extending through the housing member and terminating in a wedge member, the spoons defining a cavity for receiving the wedge member, the elongate elastic members structured to bend outwardly in response to the wedge member moving into the cavity, and a biasing member for biasing the shaft member relative to the housing member in the direction of said increasing relative translation.

15 Claims, 15 Drawing Sheets

Related U.S. Application Data continuation of application No. 18/374,742, filed on Sep. 29, 2023, now Pat. No. 12,129,152, which is a continuation of application No. 17/712,408, filed on Apr. 4, 2022, now Pat. No. 11,807,499, which is a continuation of application No. 17/082,465, filed on Oct. 28, 2020, now Pat. No. 11,446,526.

(51) Int. Cl.
*B66C 1/66* (2006.01)
*F16B 13/08* (2006.01)

(58) Field of Classification Search
CPC .............. F16B 13/0825; F16B 13/0833; F16B 13/0841; F16B 13/0883; F16B 13/045; E04G 21/3276; A63B 29/025; A63B 29/027; Y10S 248/925
See application file for complete search history.

(56) References Cited

U.S. PATENT DOCUMENTS 2,719,747 A * 10/1955 Layne .................... B66C 1/666 81/448
3,107,569 A * 10/1963 Lerick .................. F16B 13/063 411/53
3,171,322 A * 3/1965 Kaplan ................ F16B 13/065 411/60.1
3,297,293 A * 1/1967 Andrews ................ B66C 1/666 294/215
3,352,193 A * 11/1967 Lerich ................ E21D 21/0026 411/80
3,750,519 A * 8/1973 Lerich .................. F16B 13/065 411/59
4,073,212 A * 2/1978 Lerich ................ F16B 13/0858 116/200
4,074,609 A * 2/1978 Busler .................. F16B 13/065 411/45
4,204,711 A * 5/1980 Lancelot, III ........... B66C 1/666 52/125.1
4,325,575 A * 4/1982 Holt ....................... B66C 1/666 294/94
4,330,230 A * 5/1982 Giannuzzi ............ F16B 13/045 411/60.2
4,501,520 A * 2/1985 Bergner .............. F16B 13/0833 411/21
4,506,924 A * 3/1985 Nieder ..................... B66C 1/54 294/96
4,570,987 A * 2/1986 Wong .................... E04G 21/142 248/500
4,613,254 A * 9/1986 Liebig ................... F16B 13/045 411/8
4,641,986 A * 2/1987 Tsui .......................... B66C 1/66 403/150
4,705,422 A * 11/1987 Tsui .......................... B66C 1/66 294/215
4,818,163 A * 4/1989 Bereiter .............. F16B 13/0858 411/60.1
4,863,205 A * 9/1989 Schron ...................... B66C 1/66 294/94
4,904,135 A * 2/1990 Barthomeuf .......... F16B 13/063 411/60.1
5,161,916 A * 11/1992 White ................... E21D 21/008 411/24
5,248,176 A * 9/1993 Fredriksson .............. B66C 1/66 294/215
5,263,803 A * 11/1993 Anquetin ................ F16B 13/00 411/65
5,405,210 A * 4/1995 Tsui .......................... B66C 1/66 403/119
5,484,132 A * 1/1996 George ................ A63B 29/024 248/231.9
5,569,091 A * 10/1996 Haage ................... F16B 13/065 411/40
5,586,801 A * 12/1996 Sawyer ..................... B66C 1/66 294/215
5,685,678 A * 11/1997 Giannuzzi ............. F16B 13/066 411/60.2
5,823,588 A * 10/1998 Morghen .................. B66C 1/66 403/164
6,068,226 A * 5/2000 Anders ................ A63B 29/025 248/231.91
6,109,578 A * 8/2000 Guthrie ................ A63B 29/024 411/80
6,199,925 B1 * 3/2001 Alba ......................... B66C 1/66 294/215
6,283,426 B1 * 9/2001 Guthrie ................ A63B 29/024 248/231.91
6,349,985 B1 * 2/2002 Aston ....................... B66C 1/66 294/215
6,652,012 B1 * 11/2003 Fuller ....................... B66C 1/66 294/215
6,729,821 B2 * 5/2004 Guthrie ............... F16B 13/0891 248/231.91
6,827,535 B2 * 12/2004 Fuchs ................... F16B 13/065 411/9
6,953,212 B2 * 10/2005 Alba ......................... B66C 1/66 403/164
7,011,281 B2 * 3/2006 Guthrie ................ A63B 29/024 248/925
7,114,872 B2 * 10/2006 Alba ......................... B66C 1/66 294/215
7,258,316 B2 * 8/2007 Reeves ................ A63B 29/024 248/231.91
7,357,363 B2 * 4/2008 Guthrie ................ F16B 13/063 411/80
7,357,613 B2 * 4/2008 Houck ................ F16B 13/0858 411/60.3
8,192,122 B2 * 6/2012 Gaudron ............... F16B 13/066 411/63
8,201,867 B2 * 6/2012 Thomeczek .............. B66C 1/66 294/215
8,287,217 B2 * 10/2012 Pisoni ................... F16B 13/066 411/72
8,353,653 B2 * 1/2013 Guthrie ................ A63B 29/024 411/401
8,424,638 B1 * 4/2013 Guthrie ............... E04G 21/3276 248/499
8,562,053 B2 * 10/2013 Davidson .................. B66C 1/10 294/215
8,596,701 B2 * 12/2013 Alba ..................... E04G 21/142 403/194
8,622,675 B2 * 1/2014 Chen ....................... F16B 43/00 411/397
8,622,676 B2 * 1/2014 Chen ....................... F16B 43/00 411/371.2
8,839,591 B2 * 9/2014 Guthrie ............... E04G 21/3276 248/231.91
8,894,329 B1 * 11/2014 Kekahuna ............. E04B 1/4157 405/259.4
8,973,705 B2 * 3/2015 Guthrie .............. A62B 35/0068 24/165
9,255,594 B2 * 2/2016 Cabrit ..................... F16B 13/00
10,036,416 B2 * 7/2018 Moreau ................... A45F 5/021
10,450,174 B1 * 10/2019 Kucinic ..................... B66F 1/00
10,478,645 B2 * 11/2019 Maurice ............... A63B 29/024
10,752,472 B2 * 8/2020 Connell ................ E04G 21/142
11,106,252 B2 * 8/2021 Chung .................... F16B 35/06
11,167,957 B1 * 11/2021 Striebel ..................... B66C 1/66
12,194,324 B2 * 1/2025 Yang .................. A62B 35/0068
12,491,409 B1 * 12/2025 Guthrie ................ A63B 29/024
2002/0164198 A1 * 11/2002 Alba ......................... F16D 1/12 403/78
2002/0185873 A1 * 12/2002 Alba ......................... B66C 1/66 294/217
2004/0032134 A1 * 2/2004 Hageman .................. B66C 1/66 294/215

(56) References Cited

U.S. PATENT DOCUMENTS

| | | | | |
|---|---|---|---|---|
| 2004/0213633 | A1* | 10/2004 | Guthrie | A63B 29/024 403/367 |
| 2009/0056267 | A1* | 3/2009 | Reeves | A62B 1/04 52/699 |
| 2010/0207406 | A1* | 8/2010 | Thomeczek | B66C 1/66 294/215 |
| 2015/0300392 | A1* | 10/2015 | Cabrit | A63B 29/02 248/231.91 |
| 2019/0047828 | A1* | 2/2019 | Connell | E04G 15/04 |
| 2020/0206549 | A1 | 7/2020 | Shaver et al. | |
| 2020/0289898 | A1* | 9/2020 | Wagner | A63B 29/024 |
| 2023/0313826 | A1* | 10/2023 | Auston | F16B 13/0891 411/80 |

FOREIGN PATENT DOCUMENTS

| | | | | | |
|---|---|---|---|---|---|
| DE | 102016103050 | A1 | * | 8/2017 | F16B 45/002 |
| EP | 1995396 | A2 | * | 11/2008 | E04G 21/3261 |
| GB | 2094919 | A | * | 9/1982 | F16B 13/045 |
| GB | 2190164 | A | * | 11/1987 | F16B 13/066 |
| GB | 2216620 | A | * | 10/1989 | F16B 13/063 |
| WO | 97/32631 | A1 | | 9/1997 | |
| WO | WO-2005012650 | A2 | * | 2/2005 | A63B 29/024 |
| WO | WO-2017100818 | A1 | * | 6/2017 | F16B 13/066 |

* cited by examiner

EXPANSION BOLT AND PIVOT AND SWIVEL MECHANISM THEREFOR

CROSS REFERENCE TO RELATED APPLICATIONS

This application is a continuation of, and claims priority to U.S. patent application Ser. No. 18/392,514, filed Dec. 21, 2023, entitled "EXPANSION BOLT AND PIVOT AND SWIVEL MECHANISM THEREFOR", which application is a continuation of, and claims priority to U.S. patent application Ser. No. 18/374,742, filed Sep. 29, 2023, entitled "EXPANSION BOLT AND PIVOT AND SWIVEL MECHANISM THEREFOR", which application is a continuation of, and claims priority to U.S. patent application Ser. No. 17/712,408, filed Apr. 4, 2022, entitled "EXPANSION BOLT AND PIVOT AND SWIVEL MECHANISM THEREFOR", which application is a continuation of, and claims priority to U.S. patent application Ser. No. 17/082,465, filed Oct. 28, 2020, entitled "EXPANSION BOLT AND PIVOT AND SWIVEL MECHANISM THEREFOR", the contents of which are incorporated herein by reference.

FIELD OF THE INVENTION

The present invention relates to an expansion bolt, particularly for engaging holes in structures, typically to provide an anchor point for tethering a worker to the structures, and a pivot and swivel mechanism that can be used in an expansion bolt but which can also be used in other applications as well.

BACKGROUND OF THE INVENTION

An exemplary prior art expansion bolt is disclosed in U.S. Pat. No. 7,357,363. FIGS. 1 and 2 are taken from that patent, showing an expansion bolt 10 for engaging cylindrical holes, typically though not necessarily drilled or bored into concrete or other construction substrate.

Referring to FIG. 1, as is common in the art the expansion bolt 10 includes a cable 12 having a center chock 13 at a distal end thereof. The center chock has an outer surface 13*a* and a cooperating outer chocks 16 and 17 provided to engage the center chock and to accommodate linear movement of the cable 12 along a longitudinal axis "L."

The outer chock assembly 15 may include the two outer chocks referenced as 16 and 17. Each outer chock is preferably attached to a collar 20 through a respective elongate control cable or rod 22 that permits moving the outer chock along the longitudinal axis with respect to the inner chock by pushing on the collar 20.

The outer chocks 16 and 17 have inner surfaces 16*a* and 17*a* against which the outer surface 13*a* of the center chock 13 slides as a result of relative linear movement of the cable with respect to the collar 20. Particularly, when the collar 20 is pulled against the bias of a compression•spring 32 along the axis "L" in the direction of the arrow with respect to the cable, the outer chocks can move radially inwardly, to provide a contracted configuration of the expansion bolt; and conversely, when the collar is pushed back by the spring 32 in the opposite direction the outer chocks are forced radially outwardly, to provide an expanded configuration of the expansion bolt. When introduced into a hole, the outward expansion of the outer chocks is resisted by the inner surface of the hole, anchoring the expansion bolt in the hole; whereas the contracted configuration permits removing the expansion bolt from the hole.

FIG. 2 shows the center and outer chocks wedged in a hole 61. In this configuration, the chocks cannot be pulled out from the hole under an axial (i.e., directed along the longitudinal axis) load, such as may be imposed by a construction worker who is tethered to the expansion bolt and who has fallen. Expansion bolts are designed to support axial loads of at least 900 pounds for this purpose.

FIG. 2 also shows a "cleaning bushing" 62 that is used for removing the expansion bolt from the hole-once the chocks have been wedged into the hole. A hammer (not shown) is used to hammer on a punch to provide an impact force to the cleaning bushing, that knocks the center chock 14 forward relative to the outer chocks 16 and 17, thereby loosening the grip between the outer chocks and the interior surface 64 of the hole sufficient to allow a user to pull the expansion bolt out of the hole.

Returning to FIG. 1, a loop 30 is provided at a proximal end of the cable 12 providing a hand-hold for a user of the expansion bolt 10, and a means for moving the cable with respect to the collar 20. A compression spring 32 is provided between the loop 30 and the collar 20, to bias the device into its expanded configuration. The compression spring is important. Its bias protects against small amounts of slippage out of the hole that may otherwise occur as a result of the surface of the hole crumbling or deforming in response to the load applied to the loop 30. Even very small amounts of slippage may lead to a catastrophic loss of grip with potentially very serious consequences. It also allows for single-handed operation of the expansion bolt. With the spring 32 in place and the expansion bolt grasped in one hand like a syringe, e.g., the index and middle fingers are positioned on the collar 20, at "Ai" and "Az" respectively, and the thumb in the loop 30 at "B," the collar can be pulled back against the spring bias for inserting the expansion bolt in to the hole and simply released for chocking the expansion bolt snugly into the hole.

The cable 12 extends out of the hole and supports the load. Because it is a cable, it is flexible and can twist and bend elastically when it is loaded, to convert bending stress into axial stress and thereby to minimize the effects of what is known in the art as a "cross-loading" condition in which the expansion bolt would otherwise be placed under significant bending stress.

It is possible to use a "concrete anchor" to provide the anchoring function of an expansion bolt. FIG. 3 shows a typical concrete "sleeve anchor" 2. The sleeve anchor is intended to be installed in a hole which has been drilled into a concrete structure, such as a concrete floor or wall of a building.

The sleeve anchor has a housing 4 and a threaded bolt 6, the shank of which is coaxially disposed inside the housing and is able to turn relative to the housing.

The housing 4 has a plurality of leaves (leaves 4*a*, 4*b* are shown) which are azimuthally separated, relative to a longitudinal axis "L" of the sleeve anchor, by corresponding slots (slot 4*c* is shown).

The bolt 6 has a frustoconically shaped distal end 7. The bolt end 7 is sized to provide for expanding the housing 4 at the leaves as the bolt end is drawn up into the housing, as a result of turning the bolt.

Due to the presence of the slots between the leaves, the leaves are individually cantilever supported by a contiguous base 5 of the housing, and bend to allow for the expansion. The bending of the leaves is permanent, and the original configuration of the housing is not recoverable. Concrete anchors are intended to remain permanently in the structures in which they have been installed.

Exemplary prior art pivot and swivel mechanisms are shown and described in applicant's U.S. Pat. No. 8,424,638. Those prior art pivot and swivel mechanisms are particularly adapted for use as dedicated anchor points; whereas it is an object of the present invention to provide such a mechanism that has more general application, such as being a part of an easily removable and reusable expansion bolt.

SUMMARY OF THE INVENTION

An expansion bolt and pivot and swivel mechanism therefor is disclosed herein.

The expansion bolt may have a base and a plurality of radially spreadable elongate elastic members cantileveredly projecting from the base at respective points of joinder to the base and terminating in respective spoons at respective points of joinder of the spoons, wherein the elongate elastic members have respective radially defined thicknesses at the points of joinder to the base that are substantially less than the corresponding thicknesses of the base, and respective radially defined thicknesses at the points of joinder of the spoons that are substantially less than the corresponding thicknesses of the spoons.

In one embodiment, the expansion bolt comprises a housing member, a central shaft member, and a biasing member.

The housing member defines a longitudinal axis, which defines axial directions parallel thereto and radial directions perpendicular thereto. The housing member has a base and a plurality of radially spreadable elongate elastic members cantileveredly projecting distally from the base at respective points of joinder of the elongate elastic members to the base, the elongate elastic members distally terminating in respective spoons at respective points of joinder of the spoons to the elongate elastic members.

The central shaft member extends through the housing member, and terminates at a distal end thereof in a wedge member. The spoons define a cavity for receiving the wedge member. The elongate elastic members provide for increasing elastically recoverable radial expansion of the cavity as a consequence of increasing relative axial translation of the wedge member into the cavity.

The biasing member is for biasing the shaft member relative to the housing member in the direction of the increasing relative translation.

The elongate elastic members have respective radially defined thicknesses at the points of joinder of the elongate elastic members to the base that are substantially less than the corresponding thicknesses of the base, and the elongate elastic members have respective radially defined thicknesses at the points of joinder of the spoons to the elongate elastic members that are substantially less than the corresponding thicknesses of the spoons.

The expansion bolt may further comprise a ring element, a swivel housing element, and a capping element, the ring element defining a closed or closeable attachment aperture and attached to a proximal end of the central shaft member, the ring element including two spaced apart leg members, the leg members including foot portions that turn to extend toward each other, the foot portions having respective, spaced-apart relatively enlarged ends, the swivel housing element providing for receiving and at least partially containing the ends of the foot portions within the swivel housing element so that the ring element can be substantially freely rotated about a pivot axis, the swivel housing element having a first open end, and the capping element adapted for interlocking with the first open end of the swivel housing element, the capping element having a bottom surface portion of radial symmetry about a swivel axis that is distinct from the pivot axis.

The ring element may be pivotally attached to the central shaft member, to allow for pivoting the ring element about radial axis.

Alternatively or in combination, the ring element may be swivelly attached to the central shaft member, to allow for pivoting the ring element about a longitudinal axis.

The wedge element may be swivelly attached to the central shaft member, to allow for swiveling the wedge member about a longitudinal axis.

The housing member may be formed as a single piece of material, and the housing member and the wedge member may be integrally formed together as a single piece of material.

The biasing member may comprise a spring, so that the bias comprises a spring-bias.

The pivot and swivel mechanism may have a ring element that includes two spaced apart leg members having foot portions that turn to extend toward each other, the foot portions having respective, spaced-apart relatively enlarged ends; a swivel housing element having an open end for receiving and at least partially containing the ends of the foot portions so that the ring element can be substantially freely rotated about a pivot axis; and a capping element adapted for interlocking with the open end of the swivel housing element the capping element having a bottom surface portion of radial symmetry about a swivel axis that is distinct from the pivot axis.

In one embodiment, the pivot and swivel mechanism comprises a ring element, a swivel housing element, and a capping element.

The ring element defines a closed or closeable attachment aperture and includes two spaced apart leg members, the leg members including foot portions that turn to extend toward each other, the foot portions having respective, spaced-apart relatively enlarged ends.

The swivel housing element has a first open end for receiving and at least partially containing the ends of the foot portions within the swivel housing element so that the ring element can be substantially freely rotated about a pivot axis.

The capping element is adapted for interlocking with the first open end of the swivel housing element, the capping element having a bottom surface portion of radial symmetry about a swivel axis that is distinct from the pivot axis.

The swivel axis may be substantially perpendicular to the pivot axis:

The swivel housing element may have a second open end opposite the first open end, wherein the capping element has a hole therethrough, and the mechanism may further comprise a shaft extending through the hole in the capping element and the first and second open ends of the swivel housing element.

The shaft may be threaded proximate the second open end of the swivel housing element, and the mechanism further comprising a nut threaded onto the threads of the shaft.

The shaft may have a ledge for receiving the capping element over the bottom surface portion thereof.

The mechanism may further comprise an annular element concentrically disposed around the shaft and supporting the capping element.

Such annular element may be a flat washer, which may comprise Teflon.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

BRIEF DESCRIPTION OF THE DRAWINGS

A full understanding of the invention can be gained from the following description of the preferred embodiments when read in conjunction with the accompanying drawings in which:

FIG. 3 is a sectional elevation view of a typical prior art concrete sleeve anchor.

DESCRIPTION OF PREFERRED EMBODIMENTS

Embodiments of the present invention may be used to provide for the advantages of a prior art expansion bolt such as that disclosed in the '363 patent described above in a simplified and therefore cost-reduced configuration, and that does not require a tool for removal. In addition or in the alternative, embodiments of the present invention may be used to provide for the advantages of the more simply constructed prior art concrete anchor in a reusable configuration. Thus, embodiments of the present invention may be used either as expansion bolts or concrete anchors, and they may have other uses as well. Such uses may include, but are not limited to, supporting workers who are performing maintenance or construction work, and providing fall protection to such workers.

Figure 4:
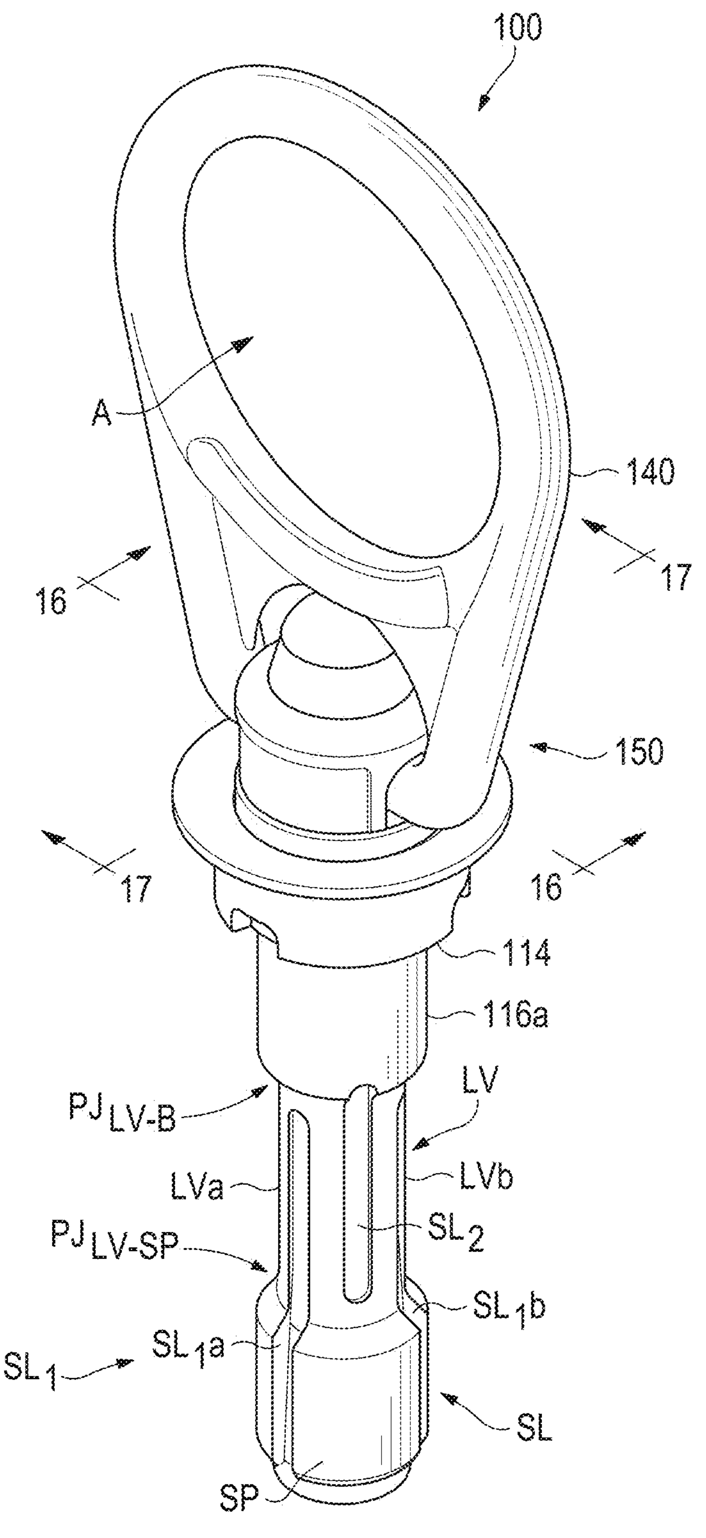
FIG. 4 is an isometric view of a preferred expansion bolt according to the present invention.
Figure 5:
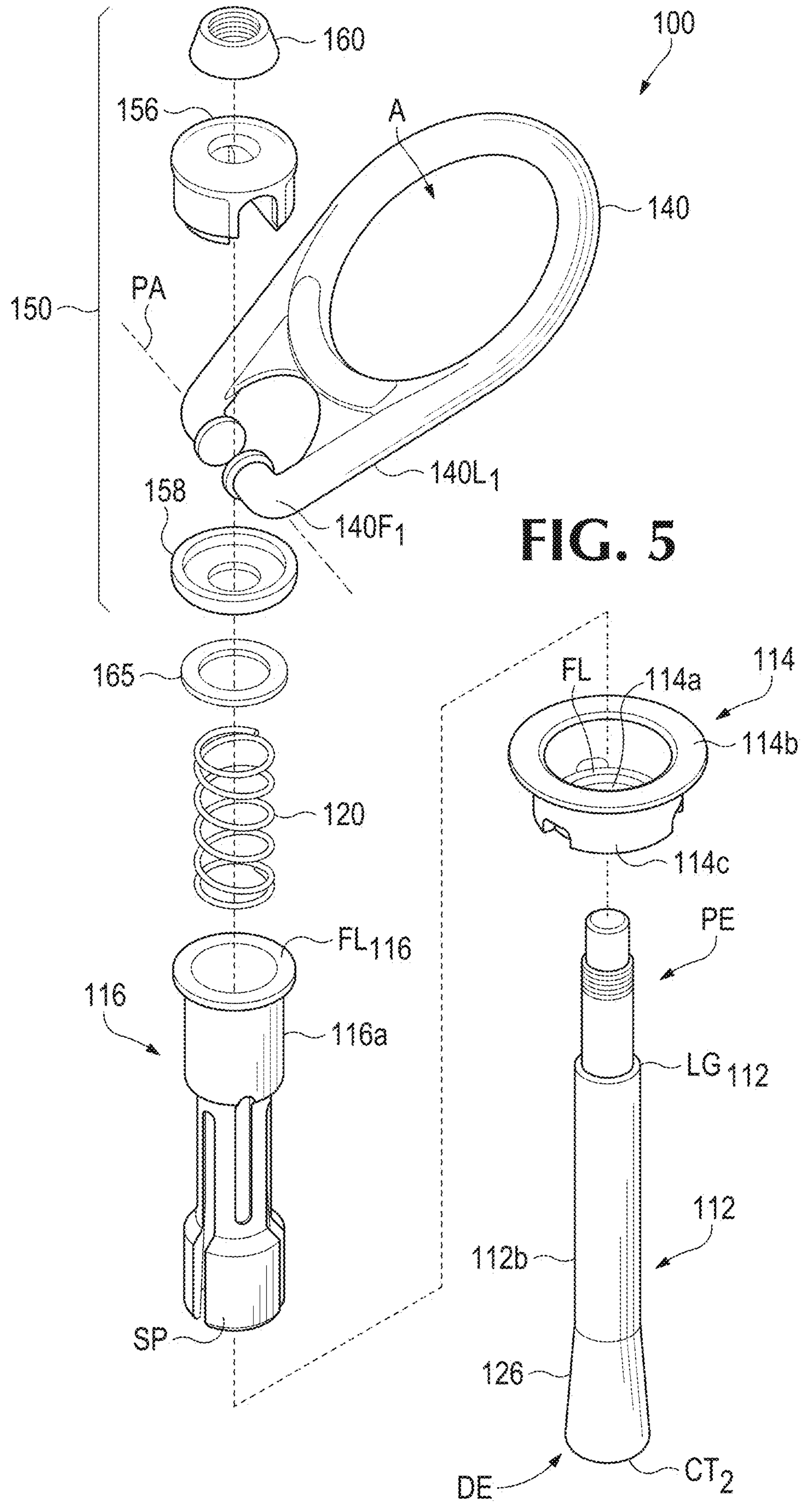
FIG. 5 is an exploded isometric view of the expansion bolt of FIG. 4.

FIGS. 4 and 5 show a preferred expansion bolt 100 according to the invention that provides for all the aforementioned advantages over the prior art.

With particular reference to FIG. 5, the expansion bolt 100 includes a central shaft 112 terminating, at a proximal end "PE" of the central shaft, in a pivot and swivel mechanism 150, and at a distal end, a wedge element 126. The proximal end PE of the central shaft ultimately terminates in a capturing tip CT1 which is not shown in FIG. 5 but is discussed in connection with FIG. 17.

The central shaft 112 is coaxially received through a central hole 114*a* in a cap 114, through a housing 116. The central hole 114*a* is large enough to loosely or slidable receive a shank 112*b* of the central shaft 112, but not so large as to allow passage of the wedge element 126.

The housing 116 houses a spring 120 which biases the housing 116 relative to the central shaft 112 during use of the device as will be explained further below. The housing 116 is captured between the cap 114 and the wedge element 126. The housing 116 has a base portion 116*a* and, as referenced in FIG. 4, a plurality of leaves "LV" (LVa, LVb are shown) depending from the base portion. The leaves are separated by first slots "SL1," (two of these first slots SL1*a*, SL1*b* are shown). The leaves project as cantilevers from the base portion at respective points of joinder "PJLv-B" (also referenced in FIG. 9) of the leaves to the base portion, and the first slots are defined by and between the leaves. In the preferred embodiment there are 3 leaves and 3 of the first slots SL1 symmetrically radially disposed about a longitudinal axis "L1" (referenced in FIG. 8) of the expansion bolt 100, i.e., a 3-fold symmetry in this particular embodiment. But the number and spacing of the leaves can be varied, and radial symmetry is not essential either.

The leaves are also preferably perforated, such as with second slots "SL2" that, along with the first slots SL1, provide migration paths for dust particles when the expansion bolt is installed in a hole.

The leaves LV distally terminate in respective "spoons" "SP," which are connected to the leaves at respective points of joinder "PJLv-sp" (also referenced in FIG. 9) of the spoons to the leaves. The aforementioned second slots SL2 may also be used to assist to provide bending flexibility to the leaves, which is also preferably otherwise provided by making them thinner than the spoons as discussed further below.

Figure 6:
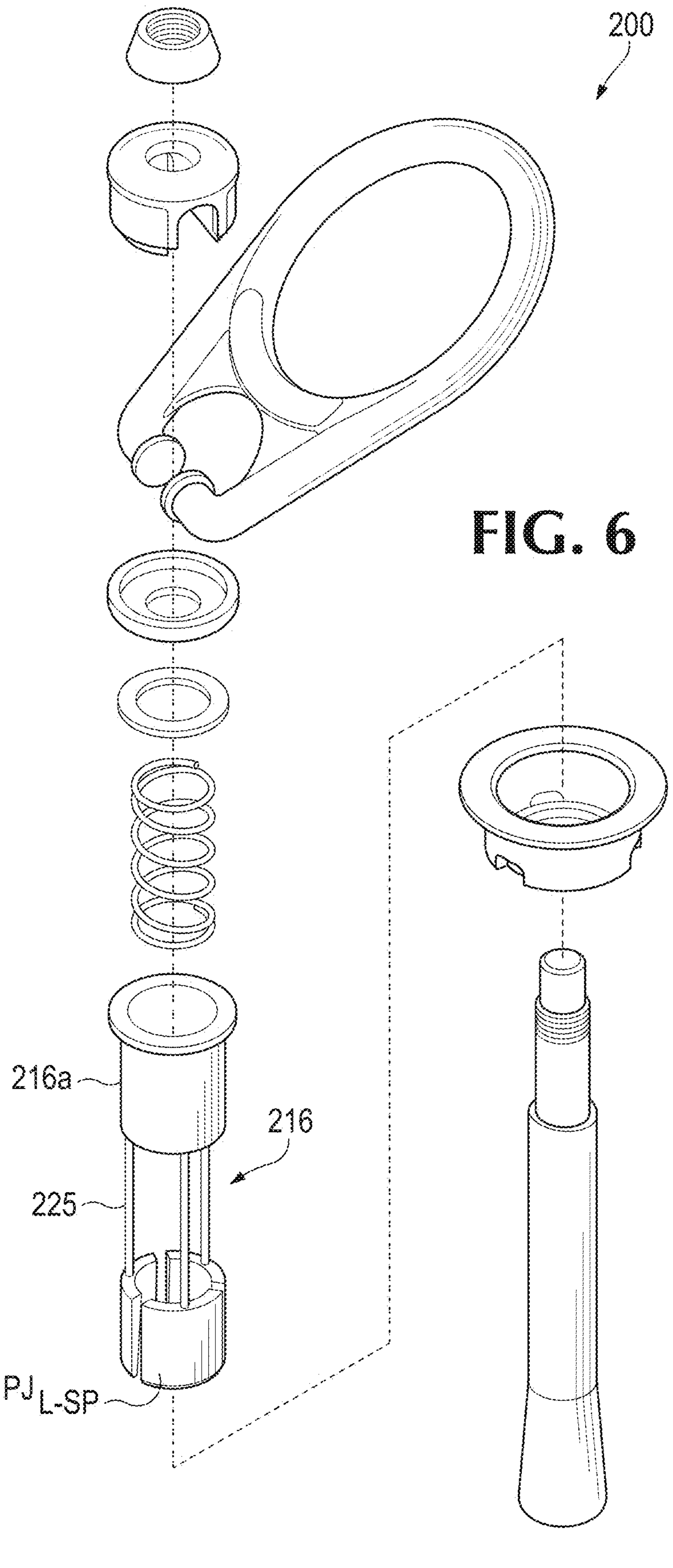
FIG. 6 is an exploded isometric view of a first alternative expansion bolt according to the invention.

FIG. 6 shows a first alternative expansion bolt 200, which is the same as the expansion bolt 100 except the housing 116 is replaced with a housing 216 that replaces the leaves LV of the embodiment 100 with an equivalent number of discrete elongate elastic members 225. The discrete elongate elastic members 225 may be, without implying any material or shape limitation; rods, wires, or cables, any of which may be woven or non-woven. As for the embodiment 100, in the preferred embodiment 200 there are three of the discrete members 225, one for each of the three spoons SP. The spoons SP may be the same in the embodiment 200 as in the embodiment 100 but are preferably modified at the points of joinder connections with the elongate members 225 as shown.

For purposes herein, the term "elongate elastic member" is intended to be generic for both the leaves LV of the embodiment 100 and the members 225 of the embodiment 200. The term "elastic" is intended herein to have its ordinary engineering meaning.

Figure 7:
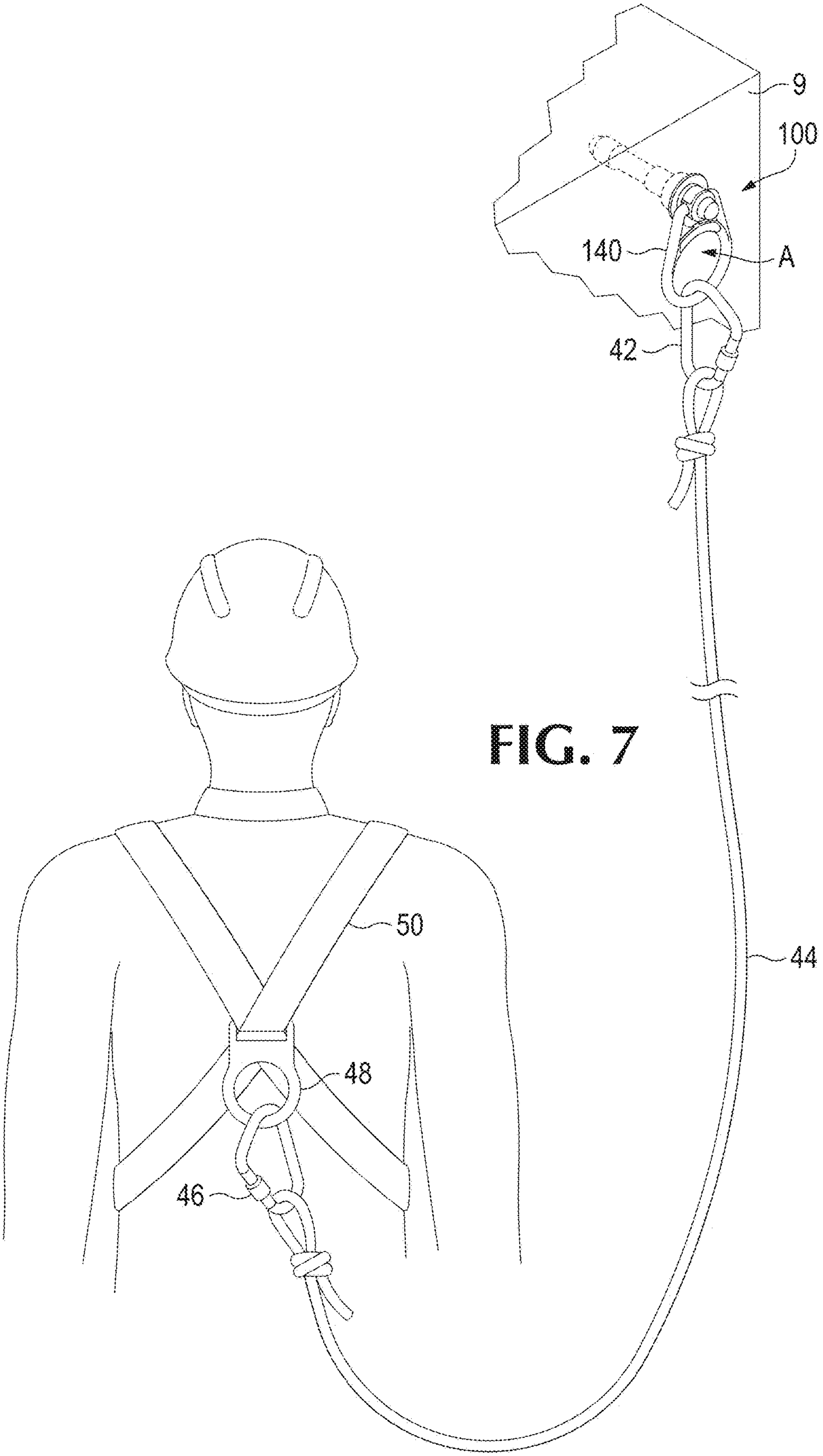
FIG. 7 is an isometric view of a worker connected to the expansion bolt of FIG. 4 and is thereby tethered to a structure according to the present invention.

Returning to FIG. 5, expansion bolts according to the invention preferably include a tethering ring, here referenced as 140, for connecting, to the expansion bolt, an additional article of hardware such as a carabiner, through a retaining aperture "A" defined by the tethering ring, such as shown in FIG. 7. The tethering ring may be provided in a standard form known in the fall-protection art as a "D-ring" but this is not essential. As shown, the aperture A would be circular over 360 degrees of arc; whereas in a D-ring, the aperture A would be circular over more than 180 degrees of arc, but less than 270 degrees of arc. Preferably, the radius of the circle defined by the aperture A is between 1.5 and 3.0 inches, more preferably between 2.0 and 2.5 inches, more preferably still between 2.20-2.30 inches, and most preferably 2.25 inches.

For connection security, the retaining aperture A should be "closed" or "closeable." For purposes herein, an aperture is "closeable" when it can be placed in a closed configuration, and an aperture is in a closed configuration for purposes herein when it is contiguously surrounded (360 degrees) by structure, so that a ring (which by this same definition also has a closed aperture) encircling any portion of the structure and passing through the aperture could not be removed from the aperture without changing the configuration of the device. As shown in preferred embodiments, the retaining aperture A is permanently closed; whereas the corresponding apertures defined by the carabiners 42 and 46 shown in FIG. 7 are closeable, and are shown in closed configurations.

Figure 8:
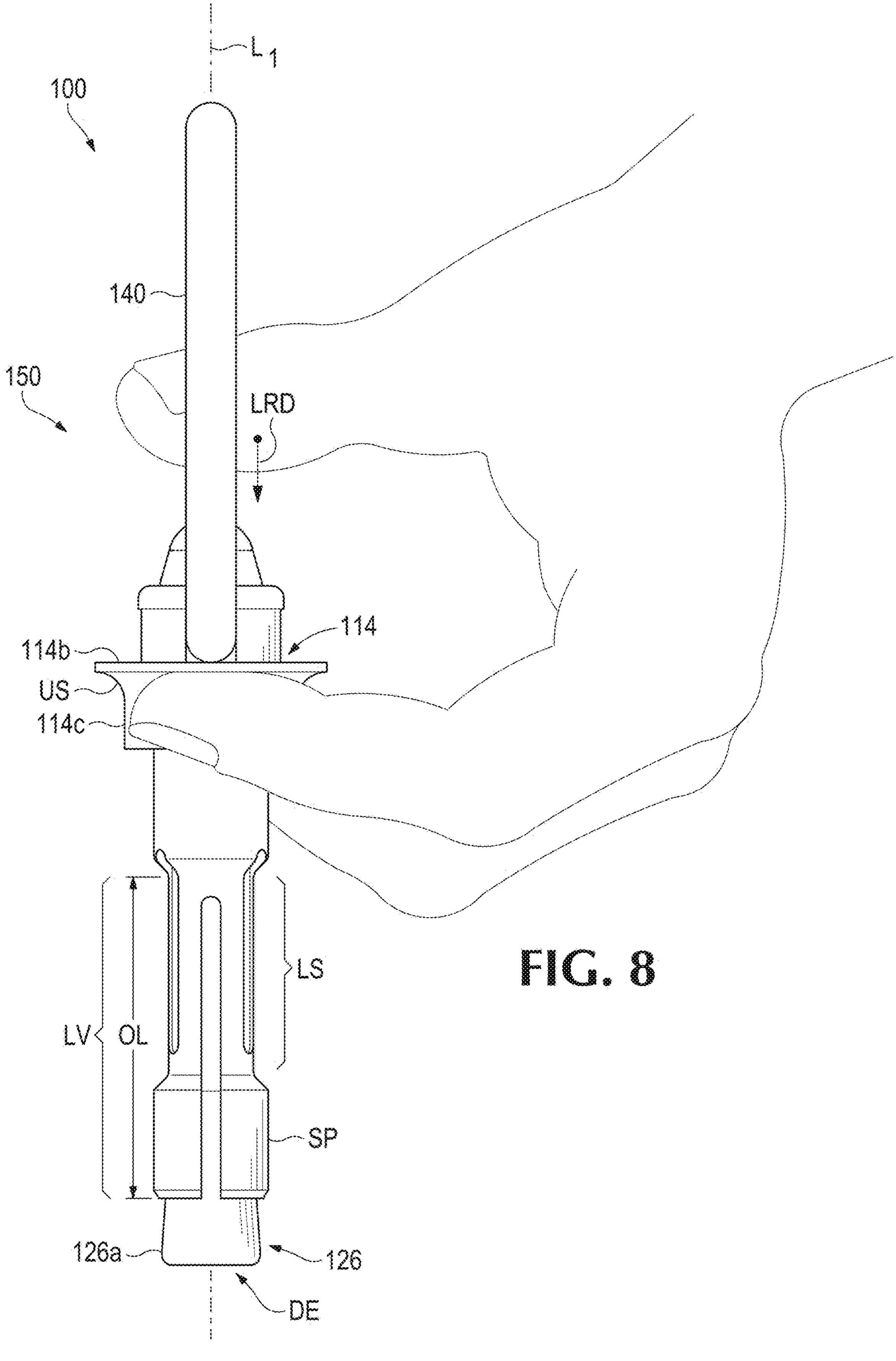
FIG. 8 is a side elevation of the expansion bolt of FIG. 4 in a state of manipulation by which the expansion bolt is configured for insertion into a hole.

FIG. 8 shows an example of how the expansion bolt 100 may be manipulated to place it in a minimum diameter configuration, measured radially of the longitudinal axis L1, so that it can be inserted into a hole with the assistance of the cap 114.

Figure 9:
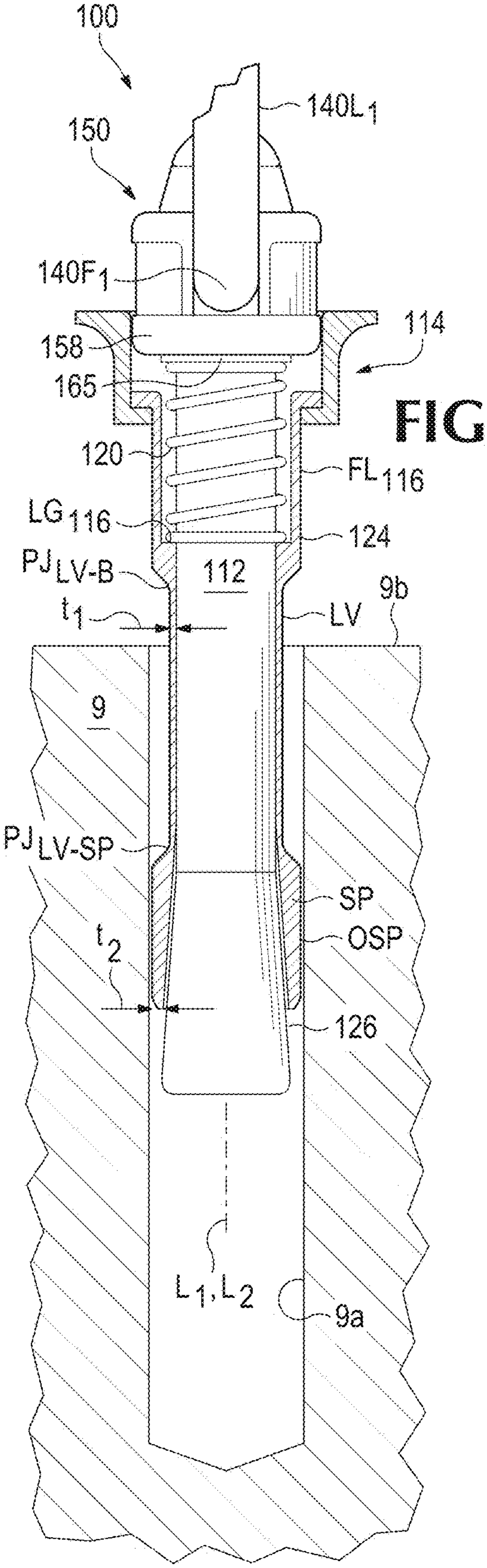
FIG. 9 is a cross-section of the expansion bolt of FIGS. 4 and 8 being inserted into a hole.
Figure 10:
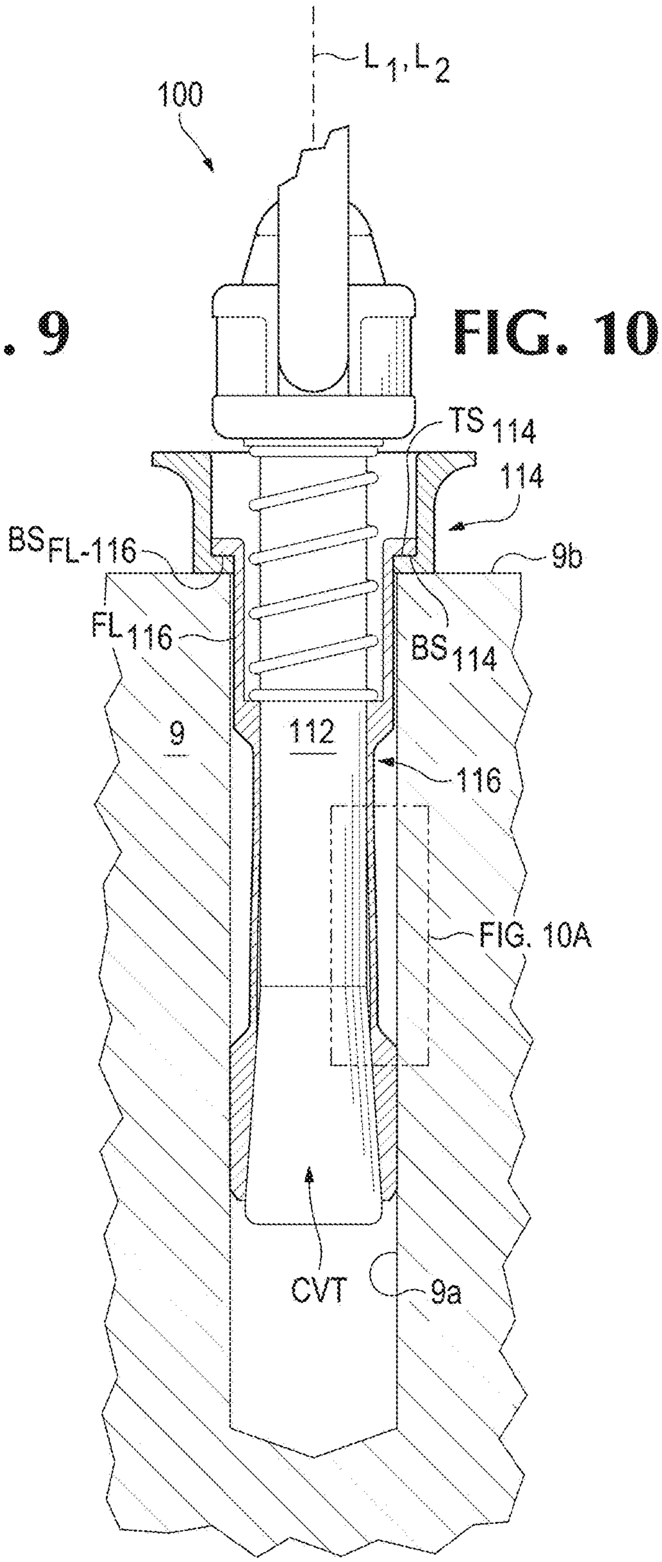
FIG. 10 is the same as FIG. 9 but with the expansion bolt in an anchoring configuration, seated in the hold.

Such a hole 9*a* in a structure 9 is shown in FIGS. 9 and 10; in which the embodiment 100 is shown. For reference in both FIGS. 9 and 10, the longitudinal axis L1 of the expansion bolt 100 shown in FIG. 8 is coincident with a longitudinal axis "L2" of the hole 9*a*.

The hole 9*a* may be adapted in advance for receiving the expansion bolt, or the expansion bolt may be adapted in advance for use in an existing hole. Typically, the hole 9*a* is a drilled hole and is therefore substantially cylindrical. But the hole 9*a* could be a cast or existing hole, and the hole 9*a* need not be cylindrical; the expansion bolt could easily be adapted for use in a square (using four leaves) or triangular shaped hole, for example. In all cases, however, the hole will have a longitudinal axis L2 which, in the case of a cylindrical hole, is the cylindrical axis of the hole. The longitudinal axis L2 of the hole aligns substantially with the longitudinal axis L1 of the expansion bolt as the expansion bolt 10 is inserted into the hole.

Returning to FIG. 8, the cap 114 has a flange portion 114*b* with an undersurface "US," and a reduced diameter body portion 114*c*, which is reduced in diameter relative to the flange portion, the diameters measured radial to the longitudinal axis $L_1$.

In the example, a user's thumb may be positioned to press down on the top of the pivot and swivel mechanism 150, and the user's index and middle fingers placed on an undersurface "US" of the flange portion 114*b* for pulling on the flange portion, against a spring bias provided by the spring 120.

In the example, a user's thumb may be positioned to press down on the top of the pivot and swivel mechanism 150, and the user's index and middle fingers placed on an undersurface "US" of the flange portion 114*b* for pulling on the flange portion, against a spring bias provided by the spring 120.

FIG. 9 shows the expansion bolt 100 partially inserted into the hole 9*a*. The expansion bolt is held as shown in FIG. 8, and the spring 120 is compressed as a consequence of being captured between: a ledge "LGl16" of the housing 116 and a bottom or distal portion of the pivot and swivel mechanism 150. The expansion bolt is thus caused to adopt a contracted, minimal diameter configuration, measured radially from the longitudinal axis L1, so that the expansion•bolt can be inserted into the hole 9*a* with the assistance of the cap 114.

FIG. 9 shows the expansion bolt 100 partially inserted into the hole 9*a*. The expansion bolt is held as shown in FIG. 8, and the spring 120 is compressed as a consequence of being captured between: a ledge "LGl16" of the housing 116 and a bottom or distal portion of the pivot and swivel mechanism 150. The expansion bolt is thus caused to adopt a contracted, minimal diameter configuration, measured radially from the longitudinal axis L1, so that the expansion bolt can be inserted into the hole 9*a* with the assistance of the cap 114.

FIG. 10 shows the expansion bolt after it has been seated in the hole and the user has let go of it. The spring 120 is allowed to extend and thereby force the central shaft 112 upwardly relative to the housing 116, drawing the wedge member 126 into a cavity "CVT" defined interiorly between the spoons SP of the housing, thereby radially spreading the spoons so as to produce a larger diameter, expanded configuration of the expansion bolt, which by forcing the spoons against the interior surface of the hole to anchor the expansion bolt in the hole defines an "anchoring configuration" of the expansion bolt in which the expansion bolt is both seated in the hole and expanded.

The spring 120 may be a coiled compression spring such as shown in, e.g., FIGS. 5 and 6, but other spring configurations could be used to achieve the same results.

Figure 10A:
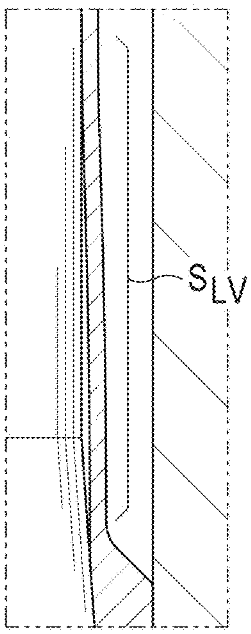
FIG. 10A is a detail view of a region of the expansion bolt of FIG. 10, showing bending of a leaf portion thereof.

FIG. 10 also shows that in the anchoring configuration of the expansion bolt, the leaves LV are caused to bend into a slight "S" configuration by their reaction to the hole, in the region indicated at "SLv" (see FIG. 10A) as a consequence of the spoons SP moving radially outwardly in response to receiving the wedge member 126, closing the slight gap between the spoons and the surface of the hole 9*a* that can be seen in FIG. 9, and as a consequence of the fact that the outer surfaces of the spoons, "OSsp" as referenced in FIG. 9, are substantially parallel to the surface of the hole, before being expanded against the surface of the hole as shown in FIG. 10.

The wedge element 126 is typically frustoconical, as defined by its outer surface 126*a*. In that case, as suggested by comparison of FIGS. 12 and 13, the inside surfaces "ISsp" of the spoons SP are preferably cylindrical (not tapered), with radial curvature that matches that of the wedge element 126 where the wedge element is widest, nearest the distal end "DE" of the central shaft 112 (see FIG. 5), and which is therefore less than that of the wedge element where the wedge element is narrowest, farthest from the end DE. This provides for maximum surface contact between the spoons and the wedge element when the expansion bolt is anchored in the hole.

Figure 12:
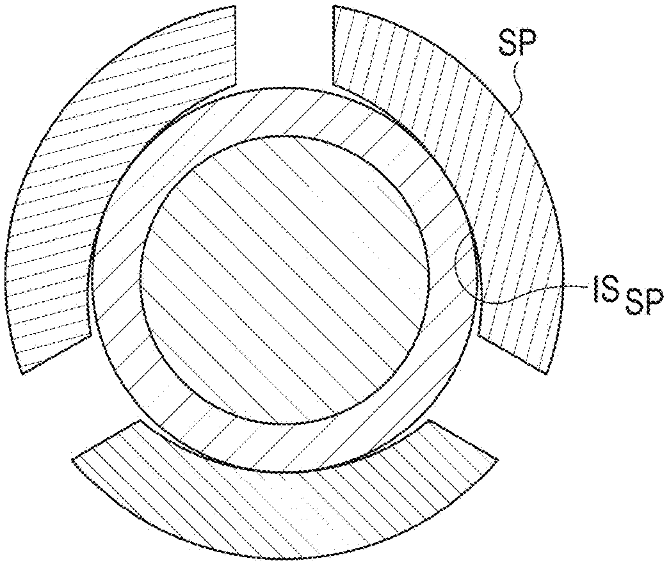
FIG. 12 is a cross-section of the expansion bolt as shown in FIG. 11 taken a long a line 12-12 thereof.
Figure 11:
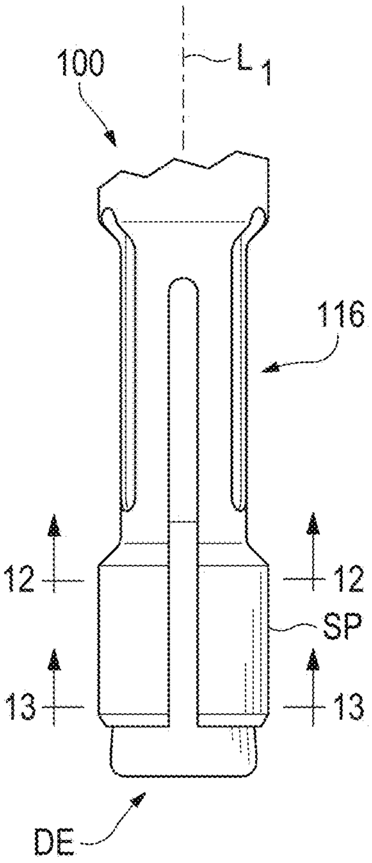
FIG. 11 is a broken side view of the expansion bolt as shown in FIG. 8 in the anchoring configuration shown in FIG. 10.
Figure 13:
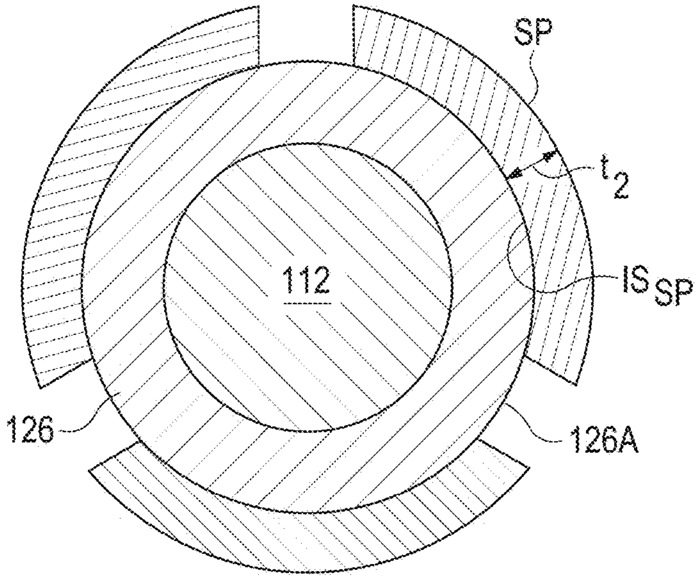
FIG. 13 is a cross-section of the expansion bolt as shown in FIG. 11 taken a long a line 13-13 thereof.

As can be seen in FIGS. 9 and 10, the cylindrical inner surfaces ISsp identified in FIGS. 12 and 13 are angled a small amount from the longitudinal axis L1, such as by about 3-5 degrees.

Staying with FIG. 5, the wedge element 126 need not be frustoconical. For example, it could be configured as a three-sided pyramid (or as another example, a two-sided wedge), for engaging three (or, in the case of a two-sided wedge, two) spoons having planar inner surfaces ISsp. The wedge element 126 may be integrally formed with the central shaft 112, although this is not essential.

The tethering ring 140 is preferably connected to the central shaft 112 so as to allow the tethering ring to pivot about a pivot axis "PA" that is perpendicular to the longitudinal axis L1 of the expansion bolt. Preferably, the tethering ring is enabled to substantially freely pivot about the pivot axis PA through a pivot angle of at least 90 degrees, more preferably at least 170 degrees, and most preferably at least 180 degrees.

It is also desirable to provide for swiveling the tethering ring 140 about the longitudinal axis L1. Providing for both pivoting and swivelling of the tethering ring is important for minimizing the effects of cross-loading conditions as noted previously.

Figure 14:
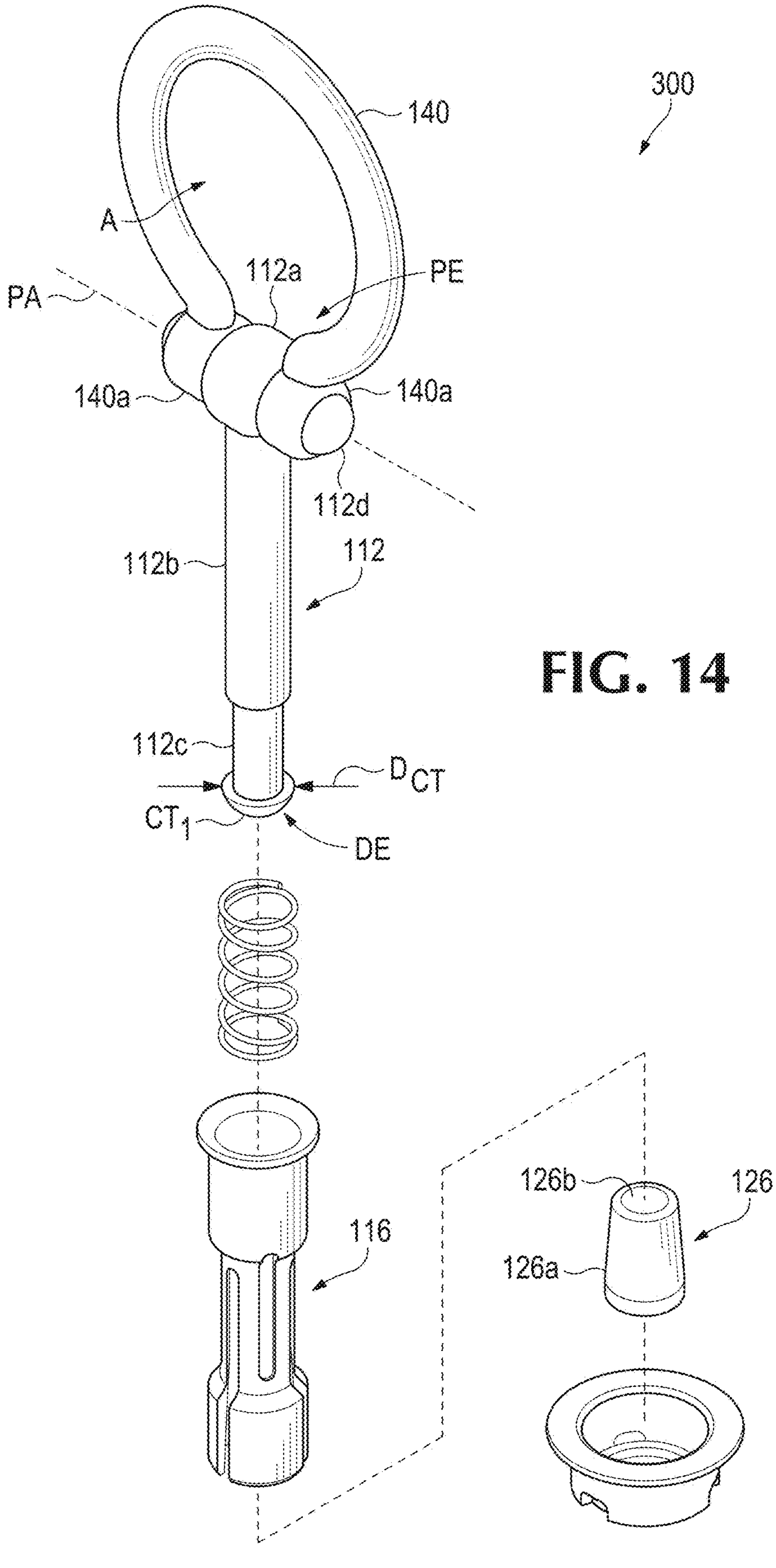
FIG. 14 is an exploded isometric view of a second alternative expansion bolt according to the invention.

One way to provide a swivelling feature in expansion bolts according to the invention is to employ a frustoconically shaped wedge member 126 that is a separate part from the central shaft 112, such as in the embodiment 300 shown in FIG. 14. In the embodiment 300, the capability to pivot the ring 140 about the pivot axis PA is provided by a connecting ring 112*a* at the proximal end "PE" of the central shaft 112, and a pivot shaft 112*d* extending through the connecting ring and through corresponding holes at terminating ends 140*a* of the tethering ring 140. The ends of the pivot shaft may be swaged to capture the ends 140*a* of the tethering ring. Of course, there are many other ways to provide for pivotally connecting the tethering to the central shaft 112, as will be readily appreciated by persons of ordinary mechanical skill.

To provide for swivelling the tethering ring in the embodiment 300, the wedge element 126 has a central hole 126*b* for loosely receiving the distal end DE of the central shaft 112 so that the wedge element can spin or swivel about the central shaft (axis Lr). For this purpose, the distal end DE of the central shaft may have a reduced-diameter portion 112*c*, which is reduced in diameter relative to the diameter of the shank 112*b*, the diameters measured radially, perpendicular to the longitudinal axis Lr.

With the wedge element 126 in place, a capturing tip "CT2" may be provided or formed at the distal end DE of the central shaft 112, such as by swaging the end of the central shaft, in cases where the central shaft is formed of metal, or by an equivalent process in cases where the central shaft is formed of plastic, to produce in the capturing tip art outer diameter "De/' that is larger than the diameter of the central shaft, for capturing and retaining the wedge element at the distal end of the central shaft. Of course, there are many other ways the wedge element 126 could be captured to the central shaft 112, as will be readily appreciated by persons of ordinary mechanical skill.

Another way to provide for swiveling the tethering ring 140 about the longitudinal axis-L1 is to incorporate a swivel mechanism on the central shaft 112. Any known swivel mechanism could be used, but a preferred and novel mechanism 150 is shown employed in the embodiment 100 of FIGS. 4 and 5 that provides for both pivoting and swivelling. Details of this pivot and swivel mechanism 150 are shown in FIGS. 15-19.

Figure 15:
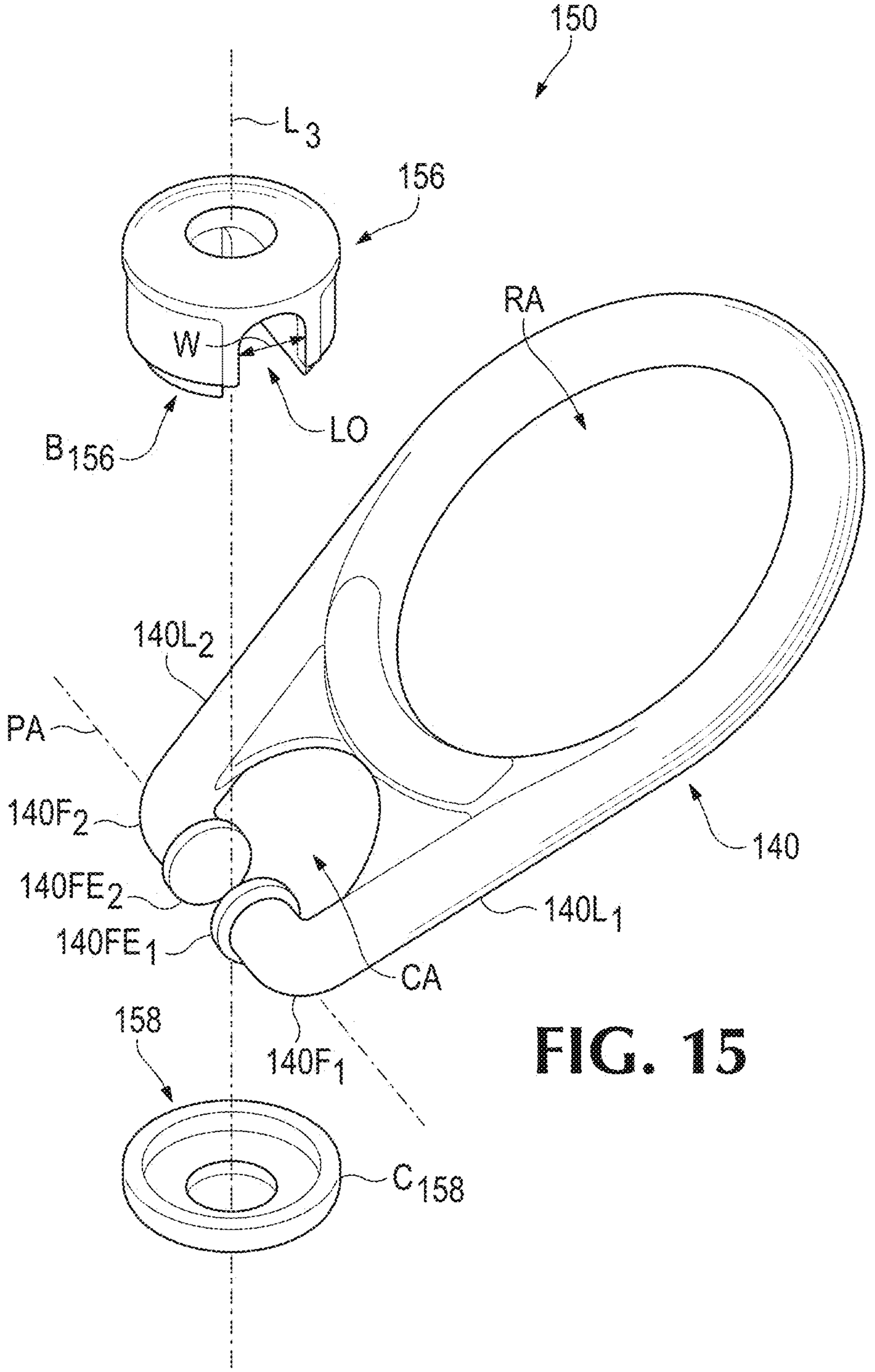
FIG. 15 is an exploded isometric view of a portion of a pivot and swivel mechanism according to the present invention.

With particular reference to FIG. 15, the pivot and swivel mechanism 150 includes the aforedescribed ring 140 (see, e.g., the discussion of FIGS. 4 and 5), a "swivel housing" 156, and a "cap" 158. The parts are shown exploded along a longitudinal axis "L3" of the pivot and swivel mechanism, which is congruent with the axis "L1" of the expansion bolt 100 when the pivot and swivel mechanism 150 is employed therein.

The ring 140 has a closed retaining aperture "RA," but it could be merely closeable. The ring 140 also has two leg portions "140L," namely "140L1" and "140L2;" the leg portions 140L each have corresponding inwardly turned foot portions "140F," namely "140F1" and "140F2;" and the foot portions each have enlarged, flanged ends "140FE," namely, "140FE1" and "140FE2." The foot portions and flanged ends are cylindrical to allow for pivoting the ring 140 about a pivot axis "PA," and the leg portions define a clearance aperture "CA" therebetween in the ring 140 so that when the ring is pivoted about the pivot axis it can clear the swivel housing 156.

The swivel housing 156 has two leg openings "LO" (only one is visible in FIG. 15) for receiving the leg portions 140L of the ring 140. The width "W" of each leg opening LO is sufficient for receiving the corresponding leg portion 140L, but smaller than the diameter of the flanged ends 140 FE to provide for partial capture of the flanged ends within the swivel housing 156. Capture of these ends inside the swivel housing is completed by fitting the cap 158 to a base "B156" of the swivel housing, to result in the configuration shown in FIG. 4.

Figure 16:
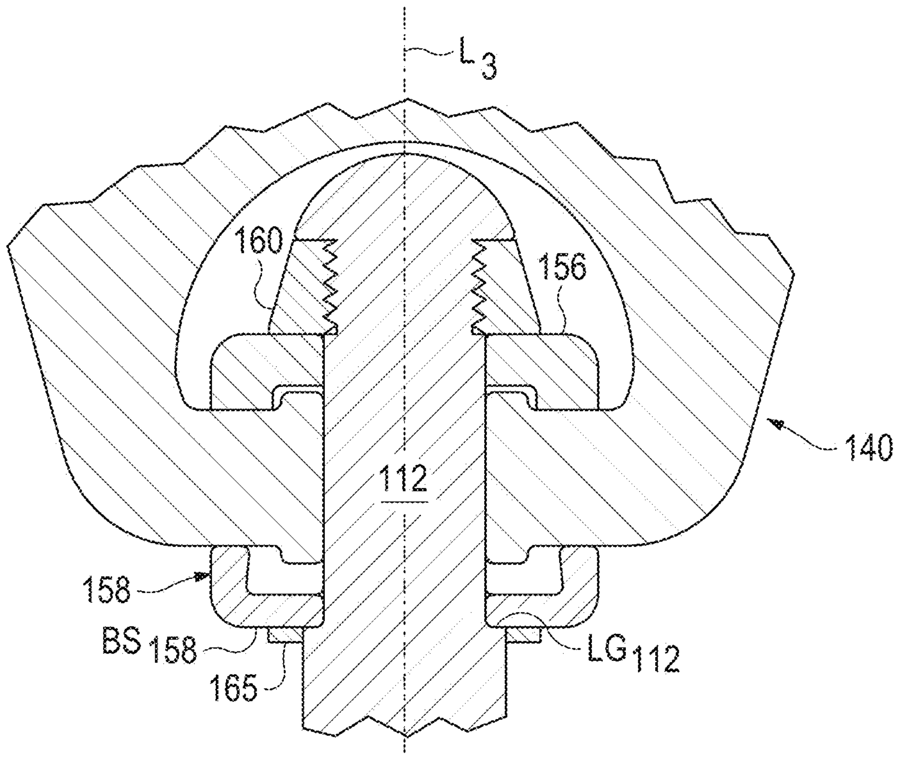
FIG. 16 is a front broken cross-section of the pivot and swivel mechanism of FIG. 15 as provided in the expansion bolt of FIG. 5, taken along a line 16-16 thereof.

As best seen in FIG. 16, with the cap 158 fitted to the swivel housing 156, and with the flanged ends 140F of the ring 140 captured therebetween, there remains space for the central shaft 112 about which (axis L2) the ring 140 can swivel. The central shaft 112 may have a ledge "LG112" on which the cap 158 may be seated (see also FIG. 5).

Figure 18:
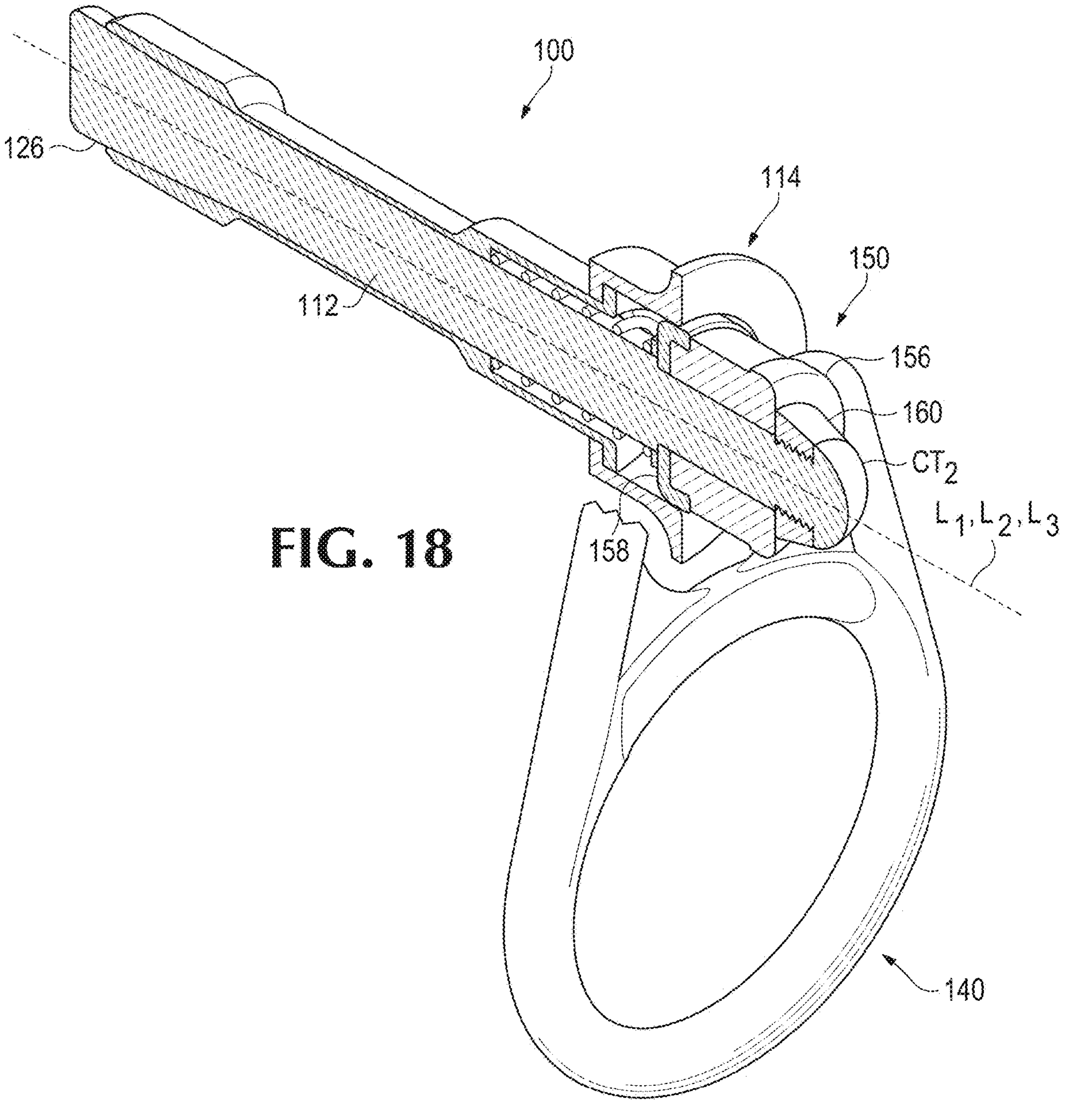
FIG. 18 is an isometric cross-section of the expansion bolt of FIGS. 4 and 5.
Figure 19:
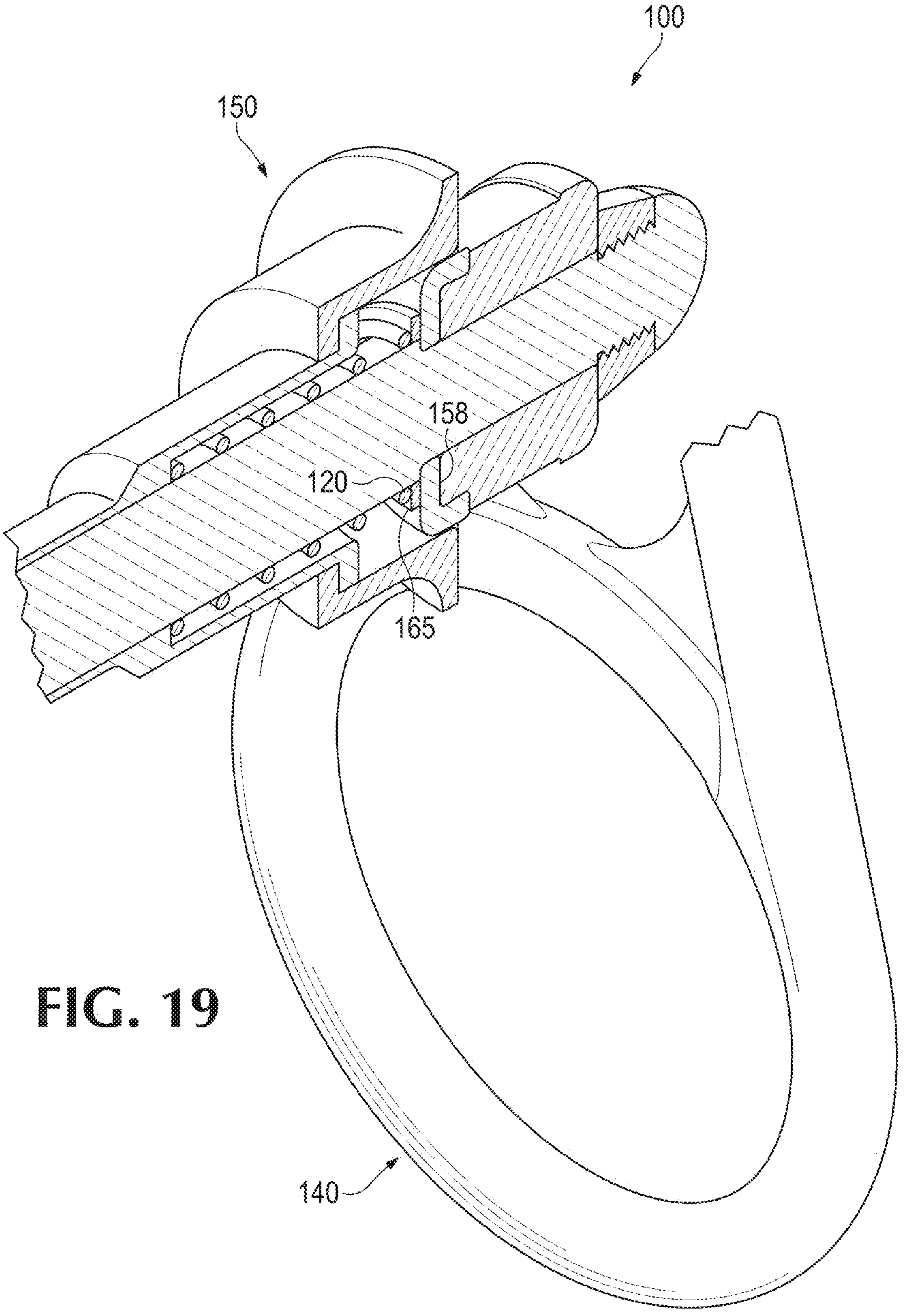
FIG. 19 is a broken isometric cross-section of the expansion bolt of FIG. 5, viewed from a different direction than that of FIG. 18.

FIG. 18 shows the pivot and swivel mechanism 150 as employed in the expansion bolt 100, sectioned for clarity. This view shows the swivel housing 156 capped with the cap 158 as it appears in FIG. 15. With reference to the latter, the cap 158 has a proximally extending, annular cup portion "C158" for interfacing with the base B156 of the swivel housing.

It is an outstanding feature of this interface that the swivel housing 156 "interlocks" into the cup portion of the cap 158, and consequently resists prying the swivel housing 156 apart from the cap 158, such as where the ring 140 is loaded downwardly, perpendicular to the axis L2.

Figure 17:
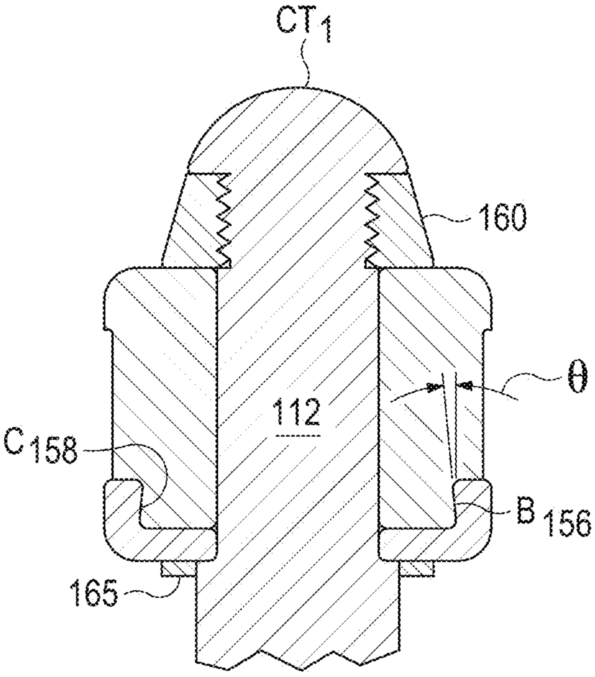
FIG. 17 is a side broken cross-section of the pivot and swivel mechanism of FIG. 15 as provided in the expansion bolt of FIG. 5, taken along a line 17-17 thereof.

As best seen in FIG. 17, this interlocking feature may be provided by an interface between the base B156 of the swivel housing and the cup portion C158 of the cap that becomes progressively narrower in the radial dimension (see the angle θ) with increasing elevation in the direction in which the swivel housing would be extracted from the cap. This interlocking feature is generally defined for purposes herein as being complementary mating structures on the base and cap that provide resistance to pulling these two elements apart along the longitudinal axis L3 (FIG. 16). As will be readily appreciated by persons of ordinary mechanical skill, there are many other ways these two elements could be interlocked together, such as by providing complementary screw threads on the two elements, or by providing complementary "snap" fitting features on the two elements such as corresponding ribs and rib-receiving voids.

Returning to FIG. 18, the swivel housing 156 may be enabled to resist being pulled out of the cap 158 in response to a force or component of force that is applied to the ring 140 axially, i.e., parallel to the axis L2, by a nut 160 that is threaded onto the distal end of the central shaft 112. With additional reference to FIG. 17, the nut 160 may be further captured by the capturing tip CT1 that was mentioned briefly above in connection with its omission from FIG. 5, that may be formed in the same manner as the capturing tip "CT2" described previously for capturing the wedge element 126 to the central shaft 112 in the embodiment 200 of the expansion bolt. Of course, there are many other ways the central shaft 112 could be adapted to resist thrust loads applied to the swivel housing, as will be readily appreciated by persons of ordinary mechanical skill.

With reference to FIG. 16, the cap 158 can be made radially symmetric about the axis L3 where it contacts the ledge LG112 to provide the desired swiveling capability; no additional structure is necessary. However, with additional reference to FIG. 19, it may facilitate this swiveling capability to provide a "Teflon" washer 165, which may be but which need not necessarily be a flat washer, to provide a larger surface BS158 to ride on, which may be but need not necessarily be supported by the spring 120. This washer may also be used to keep the end of the spring 120 off the ledge LG112.

As noted previously in connection with FIGS. 8-10, the expansion bolt 100 may be manipulated to place it in a minimum diameter configuration so that it can be inserted into a hole 9*a* in a structure 9 with the assistance of the cap 114. This will be explained further in the discussion to follow, with the understanding that this discussion applies equally as well to the embodiments 200 and 300.

As indicated in FIG. 5, the cap 114 has a floor "FL;" and as indicated in FIG. 10, this floor has atop surface "TS114" and a bottom surface "BS114." In the embodiment shown, both of these surfaces are annular, but that is not essential.

Normally, the outer face 9*b* of the concrete structure in proximity to the hole is flat; so it is normally preferable to provide that the bottom surface BS114 of the cap 114 is flat, for seating on this typically flat outer surface of the structure. But in any case, at least some portions of the bottom surface of the cap should extend radially outwardly of the longitudinal axis L3 far enough, relative to the size of the hole 9*a*, to rest on the outer face 9*b* of the structure 9, as shown in FIG. 16.

Also as best seen in FIG. 5, the base portion 116*a* of the housing 116 has a flange "FL116" at a proximal end thereof. With particular reference to FIG. 10, the flange FL116 has a bottom surface "BSFL-116" that is adapted to rest on the top surface TS114 of the cap 114, as shown in both FIGS. 9 and 10. Contact between these surfaces is maintained by compression of the spring 120.

In contrast to the prior art concrete anchor, the elongate elastic members of the housing 116 are adapted or configured to bend elastically in repeated normal use, so that the expansion bolt can be removed from the hole and reused if it has not been involved in arresting a fall; and the ends of the leaves are adapted or configured to so that they will not crush if there is a fall.

As best seen in FIG. 9, these features may be facilitated by use of a configuration of the leaves according to which the leaves LV have a radial thickness "t1" that is thinner than the minimum radial thickness "t2" of the spoons SP. A relatively small thickness t1 provides for greater bending elasticity, and a relatively large thickness t2 provides for greater crush resistance. Normally the t2 dimension is the same regardless of the t1 dimension. Providing for both the desired bending elasticity and crush resistance using leaves of constant thickness is possible, but there are undesirable consequences such as a need to substantially increase the overall length of the leaves LV (distance "OL" in FIG. 8).

Preferably, where such differential in thickness is provided, t1 is no more than 90% of t2, and more preferably t1 is no more than 70% of t2. Generally, increasing the dimension t2 provides for greater crush resistance while decreasing the dimension t1 provides for greater bending elasticity. Both greater crush resistance and greater bending elasticity reduce the possibility of permanent deformation and thus increase the effectiveness of the expansion bolt for reuse.

The same result could be provided in ways other than by use of different material thicknesses of the leg portions and the ends of the leaves. For example, the same or similar result could be provided by joining different materials; however, the use of leaves configured as shown with differential thicknesses allows for forming the leaves integrally or monolithically with the body, in a single piece of material, which provides manufacturing cost advantages over prior art expansion bolts.

Preferably, the spoons SP have sufficient crush resistance to provide that the expansion bolt can support an axial load, i.e., a load directed along the longitudinal axis L1, of at least 450 pounds, with substantially no plastic deformation, i.e., no plastic deformation that would render, to a person of ordinary skill, reuse of the expansion bolt for supporting the same load, imprudent.

It was noted previously that leaves LV with differential thicknesses can be formed integrally or monolithically with the body, in a single piece of material, which provides manufacturing cost advantages over prior art expansion bolts. The body can be formed of a metal, plastic, or composite material.

Likewise, the central shaft 112 can be formed as an integral or monolithic single piece of material, such as metal, plastic, or composite material, which likewise provides manufacturing cost advantages over prior art expansion bolts, which typically employ braided cables.

Figure 1:
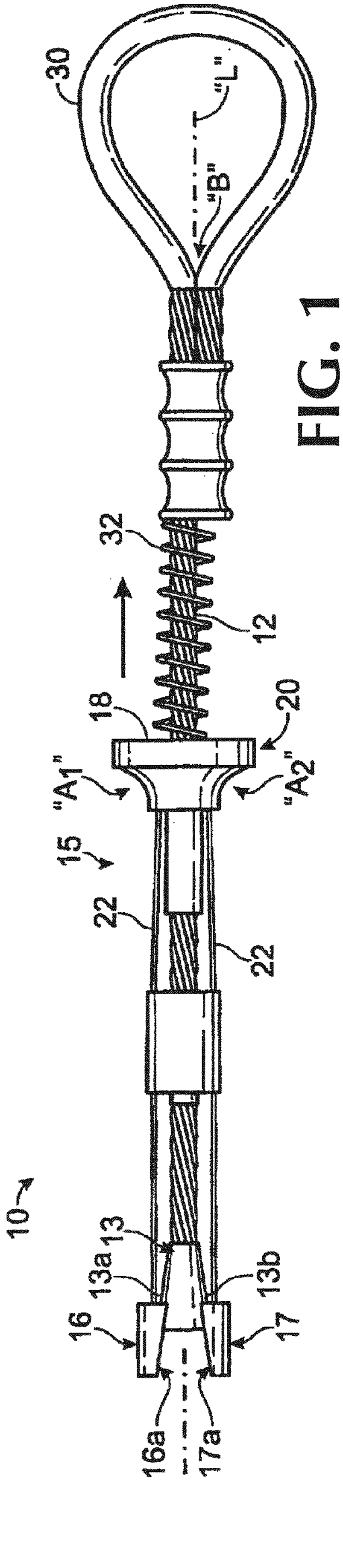
FIG. 1 is a pictorial elevation view of an exemplary prior art expansion bolt.
Figure 2:
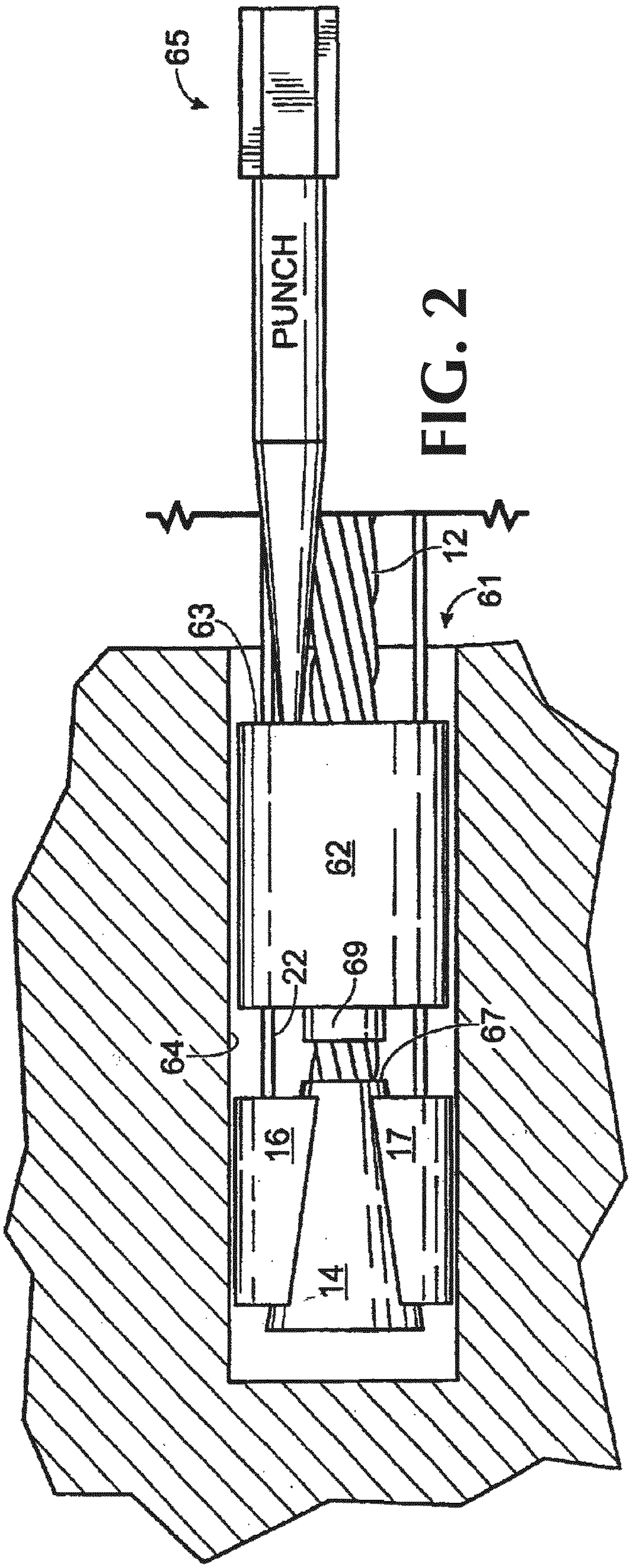
FIG. 2 is a cross-section of a portion of the expansion bolt of FIG. 1, shown installed in a hole.
Figure 3:
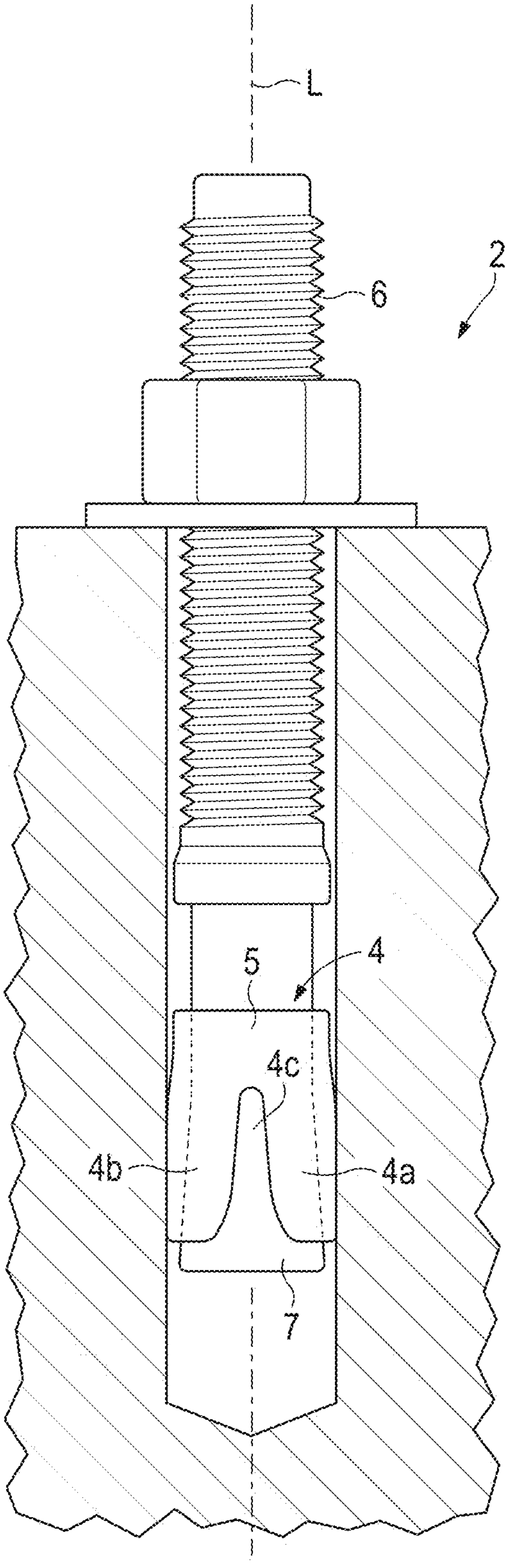
FIG. 3 (Prior Art)
FIG. 3 is

It is also advantageous to provide that the central shaft 112 is "rigid," i.e., sufficient that a compression force applied to the central shaft, when it is otherwise unloaded, by pushing on the central shaft (such as by hammering on the capturing tip CT1 of the tethering ring 140) in the load-releasing direction "LRD" shown in FIG. 8, will force the wedging member 126 out of the aforementioned cavity CVT, to loosen the hold or grip the expansion bolt has on the interior of the hole into which it is installed. This provides the outstanding advantage of allowing a user to remove the expansion bolt without need for the prior art "cleaning bushing" 62 (FIG. 2) and punch, shown and described in the '363 patent.

Achieving the desired rigidity in the central shaft 112 is facilitated by forming it as an integral, monolithic, or non-woven structure. Sufficient rigidity could be achieved with a central shaft 112 that is either partially or wholly in the form of a braided or woven cable, but cables by nature are less effective to resist compressive loads. So if the central shaft 112 were to be provided either partially or wholly in the form of a cable, that cable should be relatively thick, to compensate for its relative lack of resistance to buckling.

FIG. 7 shows the expansion bolt 100 installed in the structure 9, and being used to tether a worker to the structure. A first carabiner 42 may be connected to the ring 140 of the cap 114 and one end of a lanyard 44. The other end of the lanyard 44 may be connected by a second carabiner 46 to a D-ring 48 which in turn connects to a harness 50 worn by the worker. Other equivalent structures as known in either the recreational climbing or the industrial fall protection arts could be used for connecting the worker to the expansion bolt 100.

Figure 20:
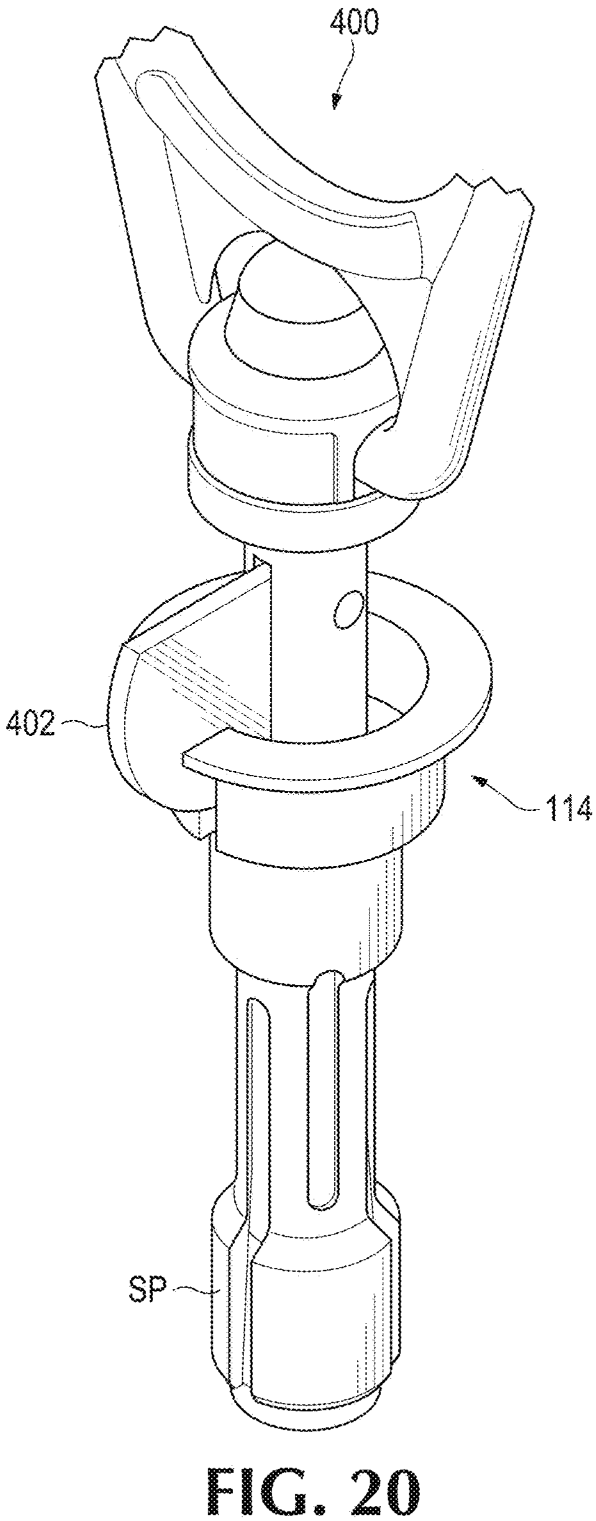
FIG. 20 is an isometric view of a third alternative expansion bolt according to the present invention.
Figure 21:
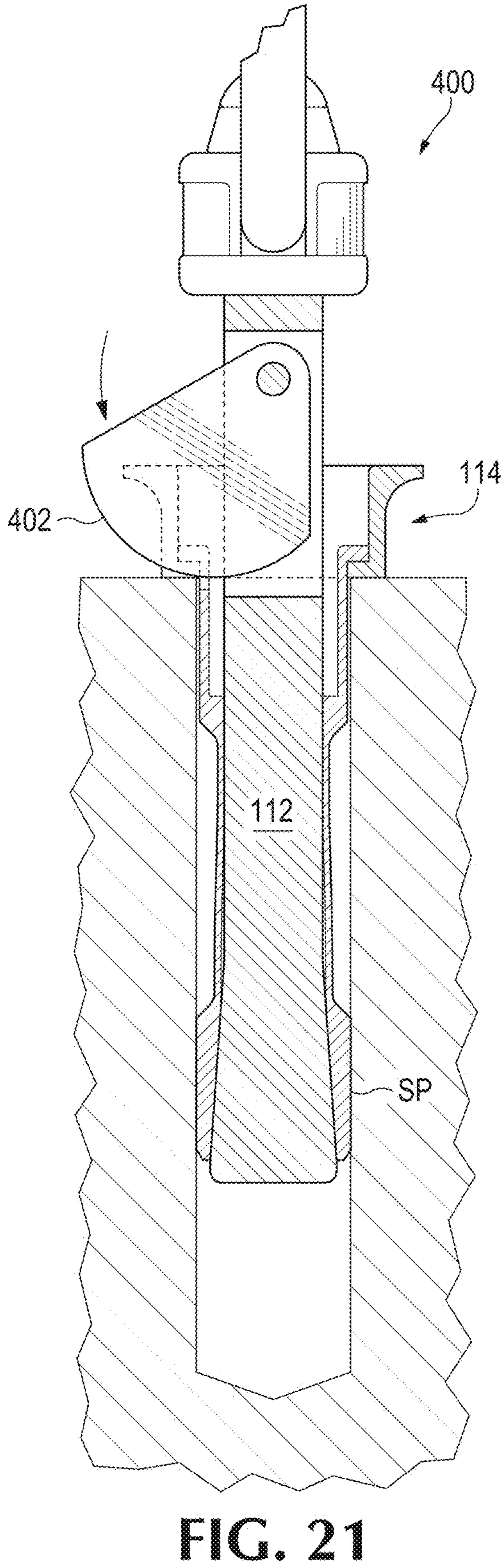
FIG. 21 is a cross-section side elevation of the expansion bolt of FIG. 20 installed in a hole.

FIGS. 20 and 21 show another alternative expansion bolt 400 that replaces the spring 120 of the embodiment 100 with an alternative biasing member which is a cam 402. The cap 114 may be retained, or not, and the cam could be used in combination with the spring 120. The cam may be set by hand in the direction of the arrow in FIG. 21 to produce a bias equivalent to that of the spring 120, for drawing the central shaft 112 upwardly relative to the spoons SP and thereby radially spreading the spoons against the inner surface of the hole; and/or it may be set or urged to stay in place by gravity.

It may be noted that the anchoring bolt in its unloaded anchoring configuration as shown in FIG. 10 is only subject to whatever anchoring force can be developed by the spring 120, but of course, the anchoring force will increase significantly if the worker falls. Although it may be possible to reuse the expansion bolt after such an event, this is not normally intended.

While expansion bolts according to the invention are typically used for installation in holes in concrete structures for the purpose of tethering a worker engaged in construction work on the structure, they could be used for other attachment or connecting purposes, in holes in other types of structures or substrates, man-made or natural.

It is to be understood that the pivot and swivel mechanism is not limited to use in expansion bolts generally or expansion bolts according to the present invention particularly. It may be used in any application in which a pivot and swivel mechanism or feature is desired.

It is to be understood that, while a specific expansion bolt and pivot and swivel mechanism therefor has been shown and described as being preferred, variations may be made, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. An expansion bolt, comprising:
- a base;
- a plurality of elongate members extending distally from the base, the elongate members distally terminating in respective spoons, at least one of the elongate members being integrally formed together with its respective spoon as a single piece of material;
- a central shaft member extending between the elongate members and terminating in a wedge member, the spoons defining a cavity for receiving the wedge member, the elongate members structured to move outwardly in response to the wedge member moving into the cavity;
- a housing disposed around the central shaft member and including a continuously cylindrical outer surface;
- a ring element supported by the housing and configured to swivel about a longitudinal axis of the central shaft member; and
- a biasing member structured to bias the plurality of elongate members relative to the central shaft member.

2. The expansion bolt of claim 1, wherein the wedge member has a frustoconical shape.

3. The expansion bolt of claim 1, wherein the central shaft member is rigid.

4. The expansion bolt of claim 1, wherein the central shaft member including the wedge member are integrally formed together.

5. The expansion bolt of claim 1, wherein the biasing member is a spring.

6. The expansion bolt of claim 1, further comprising:
- a cap disposed around the central shaft member, wherein the expansion bolt is structured such that applying a first force in a first direction to the central shaft member and applying a second force in a second direction opposite the first direction to the cap causes the biasing member to compress.

7. The expansion bolt of claim 1, wherein an inner surfaces of at least one of the spoons has a radial curvature.

8. The expansion bolt of claim 1, wherein the plurality of elongate members includes:
- a first elongate member;
- a second elongate member; and
- a third elongate member.

9. The expansion bolt of claim 8, wherein the first elongate member, the second elongate member, and the third elongate member are equally spaced around the central shaft member.

10. The expansion bolt of claim 1, wherein the central shaft member includes a first cylindrical portion having a first diameter and a second cylindrical portion having a second diameter less than the first diameter.

11. An expansion bolt, comprising:
- a base;
- a plurality of elongate members extending distally from the base, the elongate members distally terminating in respective spoons, wherein the elongate members and their respective spoons are rigid;
- a central shaft member extending along a longitudinal axis between the elongate members and terminating in a wedge member;
- a swivel housing disposed around the central shaft member;
- a ring element supported by the swivel housing and configured to swivel about the longitudinal axis; and
- a biasing member,
- wherein the expansion bolt has a first configuration in which the spoons are proximal to a widest point of the wedge member causing the elongate members to move outwardly, and a second configuration in which the widest point of the wedge member extends beyond a distal end of the spoons, and
- wherein the biasing member is structured to bias the expansion bolt toward the first configuration.

12. The expansion bolt of claim 11, further comprising:
- a cap disposed around the central shaft member, wherein the expansion bolt is structured such that applying a first force in a first direction to the central shaft member and applying a second force in a second direction opposite the first direction to the cap causes the expansion bolt to move to the second configuration.

13. The expansion bolt of claim 11, wherein the central shaft member is rigid.

14. The expansion bolt of claim 11, wherein the plurality of elongate members includes a first elongate member distally terminating in a respective first spoon, wherein the first elongate member and the respective first spoon are integrally formed together.

15. An expansion bolt, comprising:

a base;

a plurality of elongate members extending distally from the base, the elongate members distally terminating in respective spoons;

a rigid central shaft member extending along a longitudinal axis between the elongate members and terminating in a wedge member; and a swivel housing concentrically positioned with the central shaft member;

a ring element supported by the swivel housing and configured to swivel about the longitudinal axis; and a biasing member, wherein the elongate members and spoons are structured to move relative to the central shaft member between a first configuration in which the wedge member causes the spoons to move outwardly, and a second configuration in which the wedge member does not cause the spoons to move outwardly, wherein the biasing member is structured to bias the expansion bolt toward the first configuration, and wherein a diameter measured radially from a longitudinal axis of the central shaft member to outer surfaces of the spoons is greater in the first configuration than in the second configuration.

* * * * *